US011277193B2

(12) United States Patent
Park et al.

(10) Patent No.: US 11,277,193 B2
(45) Date of Patent: Mar. 15, 2022

(54) BEAM SELECTION PROCEDURES FOR MULTI-STREAM ENVIRONMENTS

(71) Applicant: QUALCOMM Incorporated, San Diego, CA (US)

(72) Inventors: Sungwoo Park, San Diego, CA (US); Arumugam Chendamarai Kannan, San Diego, CA (US); Tao Luo, San Diego, CA (US); Xiaoxia Zhang, San Diego, CA (US); Jing Sun, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/880,914

(22) Filed: May 21, 2020

(65) Prior Publication Data
US 2020/0382194 A1 Dec. 3, 2020

Related U.S. Application Data

(63) Continuation of application No. 62/855,467, filed on May 31, 2019.

(51) Int. Cl.
H04W 72/00 (2009.01)
H04B 7/06 (2006.01)
(Continued)

(52) U.S. Cl.
CPC .......... H04B 7/0695 (2013.01); H04W 72/02 (2013.01); H04W 72/046 (2013.01); H04W 72/0413 (2013.01); H04W 72/085 (2013.01)

(58) Field of Classification Search
CPC .... H04B 7/0695; H04B 7/063; H04B 7/0632; H04B 7/088; H04W 72/02;
(Continued)

(56) References Cited

U.S. PATENT DOCUMENTS 9,237,475 B2 * 1/2016 Josiam ............... H04W 72/046
9,474,009 B2 * 10/2016 Deenoo ............... H04W 8/005
(Continued)

OTHER PUBLICATIONS

CATT: "Discussion on DL Beam Management", 3GPP Draft; R1-1707475, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15-19, 2017, May 14, 2017 (May 14, 2017), XP051272683, 10 pages, Retrieved from the Internet: URL: http://www.3gpp.org/ftp/Meetings_3GPP_SYNC/RAN1/Docs/ [retrieved on May 14, 2017].
(Continued)

Primary Examiner — Amancio Gonzalez
(74) Attorney, Agent, or Firm — Holland & Hart LLP

(57) ABSTRACT

Techniques are described for selecting transmit beam sets in multi-stream environments as part of beam selection procedures. The selection procedures and the reporting procedures of the beam selection procedures may include reporting information about potential sources of interference for the selected transmit beams. A base station may transmit reference signals to a user equipment (UE) as part of a beam sweep of directional beams. The UE may measure signal quality parameters associated with the reference signals and may select a plurality of transmit beam set candidates based on the signal quality parameters. The UE may report to the base station information related to inter-beam interference in multi-stream environments. The base station may determine which transmit beams to use to transmit information to the UE based on the report received from the UE that include information about inter-beam interference.

30 Claims, 15 Drawing Sheets

(51) Int. Cl.
*H04W 72/02* (2009.01)
*H04W 72/04* (2009.01)
*H04W 72/08* (2009.01)

(58) Field of Classification Search
CPC ........... H04W 72/0413; H04W 72/046; H04W 72/085; H04L 5/0057; H04L 5/0051
USPC ...................................................... 455/452.2
See application file for complete search history.

(56) References Cited

U.S. PATENT DOCUMENTS

| | | | | |
|---|---|---|---|---|
| 9,980,267 | B2* | 5/2018 | Jalali | H04B 7/18504 |
| 10,064,183 | B2* | 8/2018 | Moon | H04B 7/0697 |
| 10,390,269 | B2* | 8/2019 | Fan | H04W 36/0094 |
| 10,390,357 | B2* | 8/2019 | Kim | H04W 4/40 |
| 10,418,724 | B2* | 9/2019 | Hreha | H01Q 21/24 |
| 10,541,741 | B2* | 1/2020 | Islam | H04B 7/0617 |
| 10,602,418 | B2* | 3/2020 | Stauffer | H04W 36/0072 |
| 10,631,263 | B2* | 4/2020 | Koo | H04W 64/00 |
| 10,686,513 | B2* | 6/2020 | Learned | H04K 3/228 |
| 10,951,285 | B2* | 3/2021 | Sang | H04L 5/001 |
| 11,006,304 | B2* | 5/2021 | Yiu | H04B 17/318 |
| 11,012,137 | B2* | 5/2021 | Cirik | H04L 5/0094 |
| 11,101,951 | B2* | 8/2021 | Park | H04L 5/0048 |
| 2014/0301312 | A1* | 10/2014 | Kim | H04W 74/0833 370/329 |
| 2015/0111519 | A1* | 4/2015 | Li | H04W 76/50 455/404.1 |
| 2016/0212793 | A1* | 7/2016 | Jung | H04W 36/0016 |
| 2017/0346544 | A1* | 11/2017 | Islam | H04W 16/28 |
| 2018/0367270 | A1 | 12/2018 | Raghavan et al. | |
| 2020/0177265 | A1* | 6/2020 | Guan | H04W 72/0453 |
| 2020/0220631 | A1* | 7/2020 | Onggosanusi | H04W 24/08 |
| 2020/0382171 | A1* | 12/2020 | Uchino | H04B 7/0617 |
| 2021/0058114 | A1* | 2/2021 | Molisch | H04W 72/121 |
| 2021/0184739 | A1* | 6/2021 | Sang | H04L 5/001 |

OTHER PUBLICATIONS

International Search Report and Written Opinion—PCT/US2020/034383—ISA/EPO—dated Aug. 10, 2020.

* cited by examiner

| Signal quality of beam pairs | | Tx beam 0 | Tx beam 1 | Tx beam 2 | Tx beam 3 | Tx beam 4 | Tx beam 5 |
|---|---|---|---|---|---|---|---|
| UE Rx panel 0 | Rx beam 0 at panel 0 | -- | -- | -- | -- | -- | -- |
| | Rx beam 1 at panel 0 | -- | -- | Selected for panel 0 | -- | Interference at panel 0 | -- |
| | Rx beam 2 at panel 0 | -- | -- | -- | -- | -- | -- |
| UE Rx panel 1 | Rx beam 0 at panel 1 | -- | -- | -- | -- | -- | -- |
| | Rx beam 1 at panel 1 | -- | -- | -- | -- | -- | -- |
| | Rx beam 2 at panel 1 | -- | -- | Interference at panel 1 | -- | Selected for panel 1 | -- |

FIG. 5A

| | Fields of Reporting Message | | | |
|---|---|---|---|---|
| Example #1 | RSRP (Tx#2 at P0) | RSRP (Tx#4 at P0) | RSRP (Tx#4 at P1) | RSRP (Tx#2 at P1) |
| Example #2 | RSRP (Tx#2 at P0) / RSRP (Tx#4 at P0) | | RSRP (Tx#4 at P1) / RSRP (Tx#2 at P1) | |
| Example #3 | RSRP (Tx#2 at P0) / ($\gamma$ + RSRP (Tx#4 at P0)) | | RSRP (Tx#4 at P1) / ($\gamma$ + RSRP (Tx#2 at P1)) | |

FIG. 5B

BEAM SELECTION PROCEDURES FOR MULTI-STREAM ENVIRONMENTS

CROSS REFERENCE

The present application for patent claims the benefit of U.S. Provisional Patent Application No. 62/855,467 by PARK et al., entitled "BEAM SELECTION PROCEDURES FOR MULTI-STREAM ENVIRONMENTS," filed May 31, 2019, assigned to the assignee hereof, and expressly incorporated by reference herein.

BACKGROUND

The following relates generally to wireless communications, and more specifically to beam selection procedures for multi-stream environments.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communication systems may communicate using directional beams. The base station and the UE may perform beam selection procedures to establish beam pair links or revise the beams being used for a communication link. Selection of beam pairs may involve challenges in multi-stream environments.

SUMMARY

The described techniques relate to improved methods, systems, devices, and apparatuses that support beam selection procedures for multi-stream environments. Generally, the described techniques provide for selecting transmit beam sets in multi-stream environments as part of beam selection procedures. The selection procedures and the reporting procedures of the beam selection procedures may include reporting information about potential sources of interference for the selected transmit beams. The base station may transmit reference signals to a user equipment (UE) as part of a beam sweep of directional beams. The UE may measure signal quality parameters associated with the reference signals and may select a plurality of transmit beam set candidates based on the signal quality parameters. The UE may transmit a report to the base station including information related to inter-beam interference in multi-stream environments. The base station may determine which transmit beams to use to transmit information to the UE based on the report received from the UE that includes information about inter-beam interference.

A method of wireless communication at a user equipment is described. The method may include receiving, from a base station, reference signals associated with a set of transmission beams, selecting a set of transmission beam sets associated with a beam selection procedure based on receiving one or more of the reference signals, where the set of transmission beam sets includes a first transmission beam set including a first transmission beam associated with a first receive beam and a second transmission beam associated with a second receive beam, and transmitting, to the base station based on selecting the set of transmission beam sets, a message indicating signal quality information for each transmission beam set of the set of transmission beam sets, where the signal quality information for the first transmission beam set is based on a first signal quality parameter associated with receiving the first transmission beam via the first receive beam and a second signal quality parameter associated with receiving the second transmission beam via the first receive beam.

An apparatus for wireless communication at a user equipment is described. The apparatus may include a processor, memory coupled with the processor, and instructions stored in the memory. The instructions may be executable by the processor to cause the apparatus to receive, from a base station, reference signals associated with a set of transmission beams, select a set of transmission beam sets associated with a beam selection procedure based on receiving one or more of the reference signals, where the set of transmission beam sets includes a first transmission beam set including a first transmission beam associated with a first receive beam and a second transmission beam associated with a second receive beam, and transmit, to the base station based on selecting the set of transmission beam sets, a message indicating signal quality information for each transmission beam set of the set of transmission beam sets, where the signal quality information for the first transmission beam set is based on a first signal quality parameter associated with receiving the first transmission beam via the first receive beam and a second signal quality parameter associated with receiving the second transmission beam via the first receive beam.

Another apparatus for wireless communication at a user equipment is described. The apparatus may include means for receiving, from a base station, reference signals associated with a set of transmission beams, selecting a set of transmission beam sets associated with a beam selection procedure based on receiving one or more of the reference signals, where the set of transmission beam sets includes a first transmission beam set including a first transmission beam associated with a first receive beam and a second transmission beam associated with a second receive beam, and transmitting, to the base station based on selecting the set of transmission beam sets, a message indicating signal quality information for each transmission beam set of the set of transmission beam sets, where the signal quality information for the first transmission beam set is based on a first signal quality parameter associated with receiving the first transmission beam via the first receive beam and a second signal quality parameter associated with receiving the second transmission beam via the first receive beam.

A non-transitory computer-readable medium storing code for wireless communication at a user equipment is described. The code may include instructions executable by a processor to receive, from a base station, reference signals associated with a set of transmission beams, select a set of transmission beam sets associated with a beam selection procedure based on receiving one or more of the reference signals, where the set of transmission beam sets includes a first transmission beam set including a first transmission beam associated with a first receive beam and a second transmission beam associated with a second receive beam, and transmit, to the base station based on selecting the set of transmission beam sets, a message indicating signal quality information for each transmission beam set of the set of transmission beam sets, where the signal quality information for the first transmission beam set is based on a first signal quality parameter associated with receiving the first transmission beam via the first receive beam and a second signal quality parameter associated with receiving the second transmission beam via the first receive beam.

In some examples of the method, apparatuses, and non-transitory computer-readable medium described herein, the signal quality information for the first transmission beam set may be based on a third signal quality parameter associated with receiving the second transmission beam via the second receive beam and a fourth signal quality parameter associated with receiving the first transmission beam via the second receive beam.

In some examples of the method, apparatuses, and non-transitory computer-readable medium described herein, the message includes a first field indicating the first signal quality parameter, a second field indicating the second signal quality parameter, a third field indicating the third signal quality parameter, and a fourth field indicating the fourth signal quality parameter.

Some examples of the method, apparatuses, and non-transitory computer-readable medium described herein may further include operations, features, means, or instructions for identifying a first signal quality ratio between the first signal quality parameter and the second signal quality parameter and a second signal quality ratio between the third signal quality parameter and the fourth signal quality parameter, where the message includes a first field indicating the first signal quality ratio and a second field indicating the second signal quality ratio.

Some examples of the method, apparatuses, and non-transitory computer-readable medium described herein may further include operations, features, means, or instructions for identifying a first signal quality ratio between the first signal quality parameter and a combination of the second signal quality parameter and a first noise measurement associated with the first receive beam and a second signal quality ratio between the third signal quality parameter and a combination of the fourth signal quality parameter and a second noise measurement associated with the second receive beam, where the message includes a first field indicating the first signal quality ratio and a second field indicating the second signal quality ratio.

In some examples of the method, apparatuses, and non-transitory computer-readable medium described herein, the first receive beam may be associated with a first antenna panel of the user equipment and the second receive beam may be associated with a second antenna panel of the user equipment.

Some examples of the method, apparatuses, and non-transitory computer-readable medium described herein may further include operations, features, means, or instructions for identifying a set of ranks for one or more transmissions, where selecting the set of transmission beam sets includes selecting one or more transmission beam sets for each rank of the set of ranks.

Some examples of the method, apparatuses, and non-transitory computer-readable medium described herein may further include operations, features, means, or instructions for selecting a rank from a set of ranks for reporting to the base station, where the signal quality information of the message includes signal quality information associated with the selected rank of the set of ranks.

Some examples of the method, apparatuses, and non-transitory computer-readable medium described herein may further include operations, features, means, or instructions for identifying transmission configuration indices associated with the set of transmission beams, where the message indicates a selected subset of the transmission configuration indices.

Some examples of the method, apparatuses, and non-transitory computer-readable medium described herein may further include operations, features, means, or instructions for identifying a rank for one or more transmissions, and identifying a quantity of transmission beams in each transmission beam set of the set of transmission beam sets based on identifying the rank, where selecting the set of transmission beam sets may be based on identifying the quantity of transmission beams in each transmission beam set.

Some examples of the method, apparatuses, and non-transitory computer-readable medium described herein may further include operations, features, means, or instructions for receiving, from the base station, a reporting configuration for the beam selection procedure, where selecting the set of transmission beam sets may be based on receiving the reporting configuration.

In some examples of the method, apparatuses, and non-transitory computer-readable medium described herein, the signal quality information of the message includes signal quality information associated with each rank of a set of ranks for one or more transmissions.

In some examples of the method, apparatuses, and non-transitory computer-readable medium described herein, receiving the reference signals further may include operations, features, means, or instructions for receiving a first reference signal at a first antenna panel coupled with a radio frequency chain, and receiving a second reference signal at a second antenna panel coupled with a second radio frequency chain.

In some examples of the method, apparatuses, and non-transitory computer-readable medium described herein, the first transmission beam may be selected for a first antenna panel and the second transmission beam may be selected for a second antenna panel.

Some examples of the method, apparatuses, and non-transitory computer-readable medium described herein may further include operations, features, means, or instructions for evaluating each combination of each the set of transmission beams received via each of a set of receive beams, where selecting the set of transmission beam sets may be based on evaluating the each combination.

In some examples of the method, apparatuses, and non-transitory computer-readable medium described herein, selecting the set of transmission beam sets further may include operations, features, means, or instructions for identifying a set of transmission beams including the set of transmission beams, selecting transmission beam sets for the set of transmission beam sets, the selecting including, selecting, for one or more additional antenna panels of the set of antenna panels, a transmission beam having a next-highest signal quality from the set of transmission beams, and removing the selected transmission beams from the set of transmission beams.

A method of wireless communication at a base station is described. The method may include receiving, from a user equipment, a message indicating signal quality information for a set of transmission beam sets, where the signal quality information of a first transmission beam set including a first transmission beam and a second transmission beam is based on a first signal quality parameter associated with receiving the first transmission beam via a first receive beam and a second signal quality parameter associated with receiving the second transmission beam via the first receive beam, selecting one or more transmission beams from the set of transmission beam sets for communicating information with the user equipment based on receiving the message, and communicating the information with the user equipment using the one or more transmission beams.

An apparatus for wireless communication at a base station is described. The apparatus may include a processor, memory coupled with the processor, and instructions stored in the memory. The instructions may be executable by the processor to cause the apparatus to receive, from a user equipment, a message indicating signal quality information for a set of transmission beam sets, where the signal quality information of a first transmission beam set including a first transmission beam and a second transmission beam is based on a first signal quality parameter associated with receiving the first transmission beam via a first receive beam and a second signal quality parameter associated with receiving the second transmission beam via the first receive beam, select one or more transmission beams from the set of transmission beam sets for communicating information with the user equipment based on receiving the message, and communicate the information with the user equipment using the one or more transmission beams.

Another apparatus for wireless communication at a base station is described. The apparatus may include means for receiving, from a user equipment, a message indicating signal quality information for a set of transmission beam sets, where the signal quality information of a first transmission beam set including a first transmission beam and a second transmission beam is based on a first signal quality parameter associated with receiving the first transmission beam via a first receive beam and a second signal quality parameter associated with receiving the second transmission beam via the first receive beam, selecting one or more transmission beams from the set of transmission beam sets for communicating information with the user equipment based on receiving the message, and communicating the information with the user equipment using the one or more transmission beams.

A non-transitory computer-readable medium storing code for wireless communication at a base station is described. The code may include instructions executable by a processor to receive, from a user equipment, a message indicating signal quality information for a set of transmission beam sets, where the signal quality information of a first transmission beam set including a first transmission beam and a second transmission beam is based on a first signal quality parameter associated with receiving the first transmission beam via a first receive beam and a second signal quality parameter associated with receiving the second transmission beam via the first receive beam, select one or more transmission beams from the set of transmission beam sets for communicating information with the user equipment based on receiving the message, and communicate the information with the user equipment using the one or more transmission beams.

In some examples of the method, apparatuses, and non-transitory computer-readable medium described herein, the message includes a first field indicating the first signal quality parameter of the first transmission beam and a second field indicating the second signal quality parameter of the second transmission beam.

In some examples of the method, apparatuses, and non-transitory computer-readable medium described herein, the message includes a field indicating a signal quality ratio of the first transmission beam and the second transmission beam of the first transmission beam set.

In some examples of the method, apparatuses, and non-transitory computer-readable medium described herein, the signal quality ratio includes a signal-to-interference ratio of the first transmission beam and the second transmission beam.

In some examples of the method, apparatuses, and non-transitory computer-readable medium described herein, the signal quality ratio includes a ratio of the first signal quality parameter to a sum of the second signal quality parameter and a noise measurement associated with the first receive beam.

In some examples of the method, apparatuses, and non-transitory computer-readable medium described herein, the signal quality information of the message includes signal quality information of transmission beams sets associated with a set of ranks.

Some examples of the method, apparatuses, and non-transitory computer-readable medium described herein may further include operations, features, means, or instructions for selecting a rank from a set of ranks for one or more transmissions based on receiving the message, where selecting the one or more transmission beams may be based on selecting the rank.

Some examples of the method, apparatuses, and non-transitory computer-readable medium described herein may further include operations, features, means, or instructions for identifying transmission configuration indices associated with each beam of the set of transmission beam sets, and identifying a subset of transmission configuration indices for the one or more transmission beams based on receiving the message, where selecting the one or more transmission beams may be based on identifying the subset of transmission configuration indices.

Some examples of the method, apparatuses, and non-transitory computer-readable medium described herein may further include operations, features, means, or instructions for transmitting, to the user equipment, a reference signal, where receiving the message may be based on transmitting the reference signal.

Some examples of the method, apparatuses, and non-transitory computer-readable medium described herein may further include operations, features, means, or instructions for transmitting, to the user equipment, a reporting configuration for a beam selection procedure, where receiving the message may be based on transmitting the reporting configuration.

Some examples of the method, apparatuses, and non-transitory computer-readable medium described herein may further include operations, features, means, or instructions for receiving messages from a set of user equipments, where the set of user equipments include the user equipment, where identifying the one or more transmission beams may be based on receiving the messages from the set of user equipments.

BRIEF DESCRIPTION OF THE DRAWINGS

FIG. 5A illustrates an example of a diagram that supports beam selection procedures for multi-stream environments in accordance with aspects of the present disclosure.

FIG. 5B illustrates examples of a reporting message that support beam selection procedures for multi-stream environments in accordance with aspects of the present disclosure.

DETAILED DESCRIPTION

Some wireless communication systems may communicate using directional beams. The base station and the user equipment (UE) may perform beam selection procedures to establish beam pair links or revise the beams being used for a communication link. Measurement or reporting of signal quality for transmit beams may be used by the base station or the UE for beam selection. However, in various environments, beam selection based on measured or reported signal quality may result in sub-optimal beam selection because of inter-beam interference.

Techniques are described for selecting transmit beam sets in multi-stream environments as part of beam selection procedures. The selection procedures and the reporting procedures of the beam selection procedures may include reporting information about potential sources of interference for the selected transmit beams. The base station may transmit reference signals to the UE as part of a beam sweep of directional beams. The UE may measure signal quality parameters associated with the reference signals and may select a plurality of transmit beam set candidates based on the signal quality parameters. The UE may transmit a report to the base station including information based on received signal quality (e.g., for a beam pair) and inter-beam interference in multi-stream environments. The base station may determine which transmit beams to use to transmit information to the UE based on the report received from the UE that includes or is based on information about inter-beam interference.

Aspects of the disclosure are initially described in the context of wireless communications systems. Aspects of the disclosure are described in the context of a process flow and diagrams. Aspects of the disclosure are further illustrated by and described with reference to apparatus diagrams, system diagrams, and flowcharts that relate to beam selection procedures for multi-stream environments.

Figure 1:
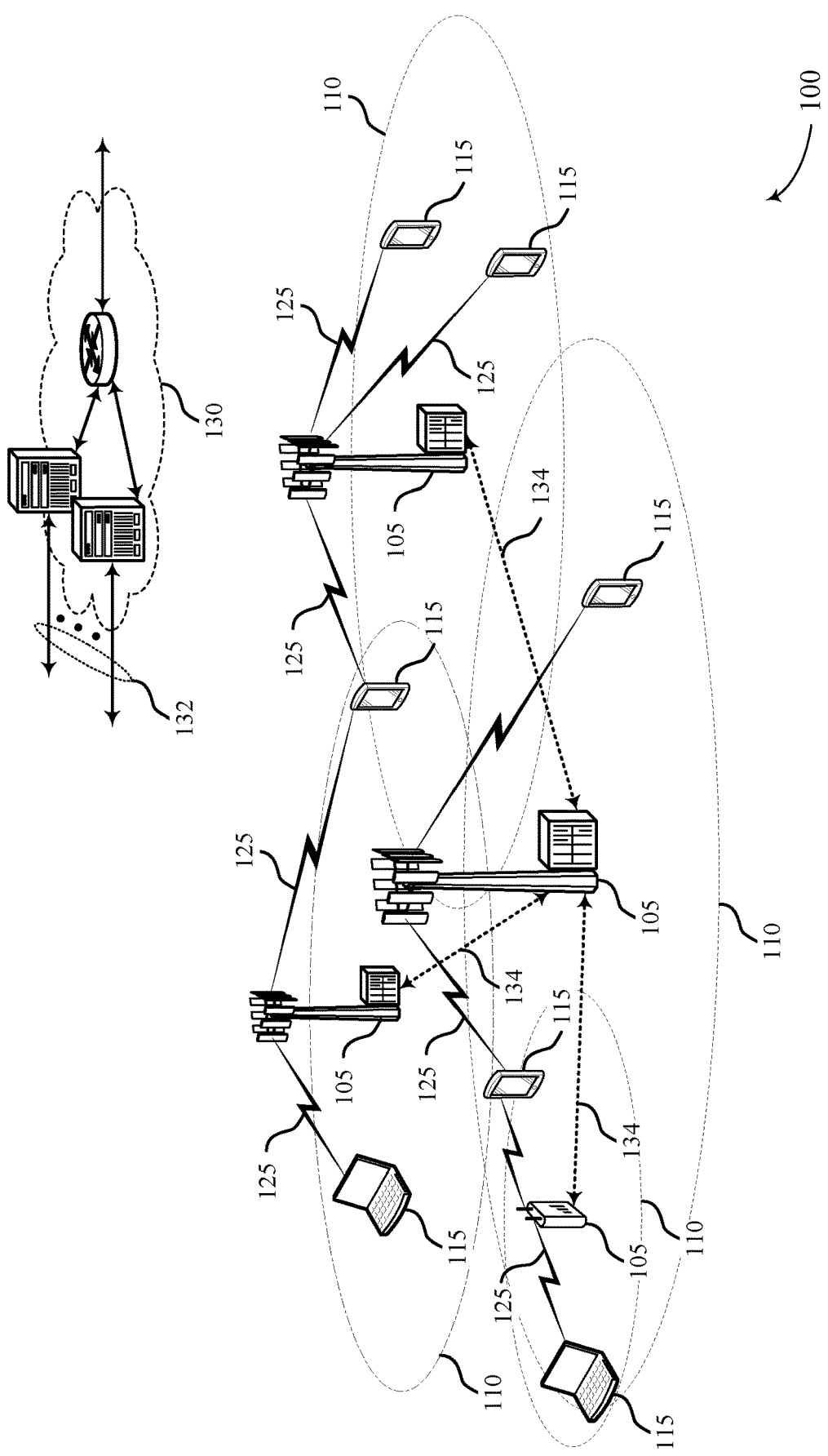
FIG. 1 illustrates an example of a system for wireless communications that supports beam selection procedures for multi-stream environments in accordance with aspects of the present disclosure.

FIG. 1 illustrates an example of a wireless communications system 100 that supports beam selection procedures for multi-stream environments in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 \, T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

The base station 105 and one or more UEs 115 may perform beam selection procedures to establish or modify beam pair links. In multi-stream environments, the beam selection procedures may not consider inter-beam interference between selected transmit beams. Techniques are described for UEs 115 to identify inter-beam interference, report inter-beam interference to the base station 105, or select transmit beams based on inter-beam interference as part of a beam selection procedure. The base station 105 may be configured to select transmit beams based on information about inter-beam interference as part of a beam selection procedure. The base station 105 or the UEs 115 may be configured to perform rank adaptation based on the inter-beam interference information.

Figure 2:
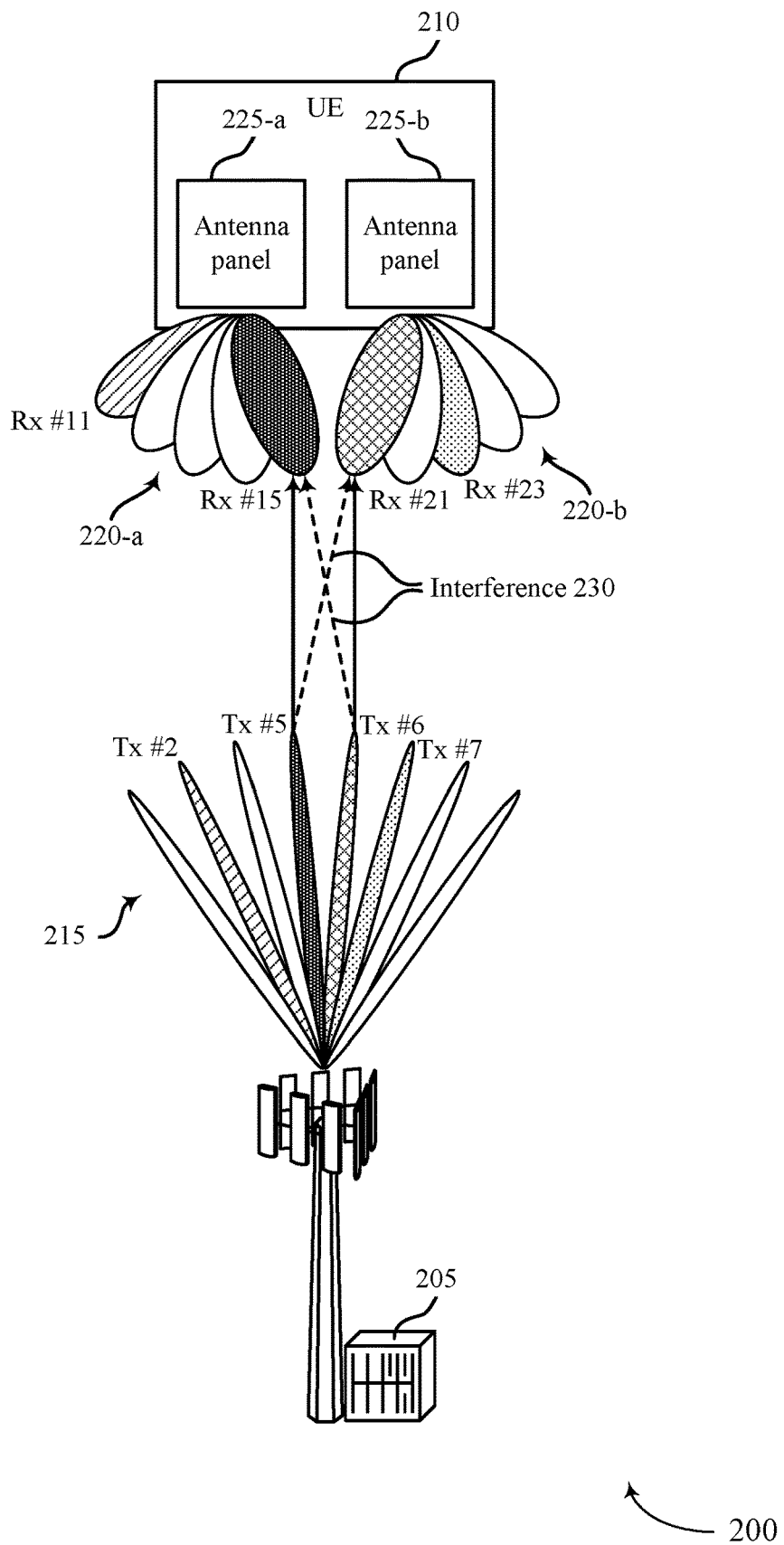
FIG. 2 illustrates an example of a wireless communications system that supports beam selection procedures for multi-stream environments in accordance with aspects of the present disclosure.

FIG. 2 illustrates an example of a wireless communications system 200 that supports beam selection procedures for multi-stream environments in accordance with aspects of the present disclosure. In some examples, the wireless communications system 200 may implement aspects of the wireless communications system 100. The wireless communications system 200 may include one or more base stations 205 and one or more UEs 210. The base stations 205 may be examples of the base stations 105 described with reference to FIG. 1. The UEs 210 may be examples of the UEs 115 described with reference to FIG. 1.

The wireless communications system 200 may support beam selection procedures to identify or select transmit beams 215, receptions beams 220 or both. In some cases, beam selection procedures may be used as part of or after an initial access phase of the UE 210 with the base station 205. Additionally, or alternatively, beams may become misaligned, for example, as the UE 210 moves throughout the coverage area of the base station 105. As the beams become misaligned, the signal quality of the communication link between the base station 205 and the UE 210 may degrade. To address such issues, the base station 205 and the UE 210 may implement beam selection procedures to determine whether new transmit beams or reception beams should be used.

In some beam selection procedures, beam sweeping may occur at both the base station 205 and the UE 210. The base station 205 may sweep through a plurality of transmit beams 215 over a duration of time. Each transmit beam 215 may have an associated beam index. The UE 210 may, over the same duration, sweep through a plurality of receive beams 220. A receive beam 220 may refer to a receive configuration or a receive beam configuration used for directional listening. In some examples, the receive beam 220 may refer to post processing techniques applied to energy received at an antenna panel of the UE 210. In some cases, the beam sweeping performed by the base station 205 and the beam sweeping performed by the UE 210 are coordinated such that multiple combinations (e.g., every combination) of transmit beams 215 and receive beams 220 are measured.

The UE 210 may measure and select one or more beam pairs based on the beam sweeping. A beam pair may refer to a transmit beam 215 and a receive beam 220. The UE 210 may measure a signal quality parameter, such as reference signal received power (RSRP), for each beam pair. In an example in which there are two transmit beams 215 (e.g., Tx0 and Tx1) and two receive beams 220 (e.g., Rx0 and Rx1) in the beam selection procedure, the possible beam pairs are Tx0-Rx0, Tx1-Rx0, Tx0-Rx1, and Tx1-Rx1. The UE 210 may measure the signal quality parameter for each of these beam pairs. The UE 210 may select one or more of these beam pairs to report back to the base station 205 as part of the beam selection procedure.

The UE 210 may transmit a report to the base station 205 indicating the signal quality parameters for the beam pairs selected by the UE 210 during the beam selection procedure. The base station 205 may use the report to select the transmit beam 215 that will be used after the beam selection procedure. In some cases, the report may include a beam index for the selected transmit beam(s) 215 and the signal quality parameter for the selected transmit beam(s) 215. In some cases, the UE 210 may refrain from reporting information about the receive beams 220 used to obtain the signal quality parameter. Rather, in some cases, the UE 210 may manage which receive beam 220 to use based on the transmit beam 215 selected by the base station 205 (e.g., based on the selected beam pairs). In other cases, the report may include information about the receive beams 220 or the beam pairs. In some of these cases, the base station 205 may select a receive beam 220 for the UE to use and communicate an indication of the selected receive beam 220 to the UE 210.

When the base station 205 and the UE 210 are communicating in a multiple stream environment, enhanced beam selection procedures and reporting procedures may be used. Examples of multi-stream environments may include an environment in which the UE 210 has multiple antenna panels 225 and each antenna panel 225 has its own radio frequency chain, an environment in which the UE 210 has a single antenna panel 225 with multiple radio frequency chains, or a combination thereof. A group of antenna elements, which may include two or more antenna elements in one or more antenna arrays or sub-arrays may be referred to herein as an antenna panel, which may correspond to a physical antenna panel or hardware module at a UE or to a virtual antenna panel that may include two or more antenna elements that are a subset of antenna elements at a physical antenna module or that span multiple antenna modules.

Additional multi-stream environments may include multiple UEs being served by the base station 205, where the base station 205 transmits to different UEs using different spatial resources or transmission configuration indexes (TCIs). Each UE in a multi-stream environment may be associated with a rank or a rank indicator. The rank may be a measure indicating how many paths (e.g., streams) the channel between the base station 205 and the UE 210 offers. In an example in which the rank is one, the channel may support a single path or stream. In an example in which the rank is two, the channel may support two paths or streams. In an example in which the UE 210 is capable of supporting N number of paths or streams, the UE 210 may be capable of communicating using rank one to rank N. In an example in which the UE 210 is capable of supporting 4 streams, the rank for the communications between the UE 210 and the base station 205 may be rank one, rank two, rank three, or rank four. Multi-stream environments may be examples of multiple-in multiple-out (MIMO) environments.

The upper limit for the number of streams or rank supported by the UE 210 may be determined based on the number of panels or radio frequency chains supported by the UE 210. In the illustrative example of FIG. 2, the UE 210 includes a first antenna panel 225-a with a first radio frequency chain and a second antenna panel 225-b with a second radio frequency chain. In some examples, the UE 210 may include any number of antenna panels and any number of radio frequency chains.

For multi-stream environments, the beam selection procedures may be configured to select transmit beams for one or more streams being used to communicate between the base station 205 and the UE 210. As part of a beam selection procedure, the UE 210 may perform group-based beam reporting. In a first example, the UE 210 may report the signal quality parameters (e.g., RSRPs) of the best (e.g., based on criteria, for example, the signal quality parameters) K transmit beams 215 per each of antenna panels 225-a and 225-b, where K may be predetermined or configured for different ranks. In some cases, a group may be defined as associated with an antenna panel (e.g., a number of groups equals a number of antenna panels). In some cases, a group may be defined as a radio frequency chain (e.g., a number of groups equals a number of radio frequency chains). For the example shown in FIG. 2, the UE 210 with the two antenna panels 225-a and 225-b may report two groups of transmit beams 215, one group of K transmit beams 215 for antenna panel 225-a, and a second group of K transmit beams 215 for antenna panel 225-b. For group reporting, transmit beams 215 for different groups may be received simultaneously at the UE 210 while transmit beams 215 for the same group may not be able to be received simultaneously at the UE 210. That is, the base station 205 may select one transmit beam 215 from the first group and one transmit beam 215 from the second group.

In a second example, the UE 210 may report the signal quality parameters (e.g., RSRPs) of the best (e.g., based on criteria, for example, the signal quality parameters) M sets of transmit beams 215, where M may be predetermined or configured for different ranks. In the second example, a group may be defined as a transmit beam set (e.g., a number of groups equals a number of transmit beam sets). That is, the transmit beams 215 for each group can be received simultaneously at the UE 210 while transmit beams 215 selected from different groups may not be received simultaneously at the UE 210.

Beam selection procedures in multi-path environments that use such reporting procedures during beam selection procedures may not be able to find the best (e.g., based on criteria, for example, the signal quality parameters) transmit beam set for multi-beam operation and/or may not be able to perform proper rank adaption. Such reporting may not consider inter-beam interference 230 between a first transmit beam selected for a first antenna panel 225-*a* and a second transmit beam selected for a second antenna panel 225-*b*. In such cases, the signal quality parameters may be used to identify the best (e.g., based on criteria, for example, the signal quality parameters) transmit beams for each antenna panel individually, but the combination of the selected transmit beams may not be the best (e.g., based on additional criteria, for example, signal interference) set of transmit beams for communications between the base station 205 and the UE 210 more generally. In an example, the beam pair {Tx #5, Rx #15} and the beam pair {Tx #6, Rx #21} have the highest signal quality parameters (e.g., RSRP) for their respective antenna panels. However, although the beam pairs may have relatively high signal quality parameters, the rank-2 transmission with the Tx-beam set {Tx #5, Tx #6} may be negatively impacted due to interference (e.g., inter-beam interference 230) between the two beams. In some cases, for example where the UE 210 reports the signal quality parameter for the transmit beams without additional information, the base station 205 may not be able to avoid such cases of inter-beam interference.

Additionally, in some cases in which the UE 210 reports the signal quality parameter for the transmit beams without additional information, the base station 205 may not be able to perform rank adaptation. Rank adaptation may refer to the selection (e.g., by the base station 205 or the UE 210) of a number of streams should be used for communication between the base station 205 and the UE 210. For example, in some cases, transmitting data using a single stream (e.g., rank one) may result in a communication link having improved performance (e.g., higher throughput, higher quality, etc.) compared to transmitting data using two streams (e.g., rank two) because of interference and other signal quality issues. For example, the signal quality parameters may indicate that the transmit beams {Tx #5, Tx #6} would have the highest signal quality parameters for their respective antenna panels. However, the signal quality parameters alone may not account for the inter-beam interference 230, as the inter-beam interference 230 may negatively impact the transmit beam set. In some examples, a rank one transmission with Tx #5 may be better (e.g., based on criteria, for example, signal quality) than rank-2 transmission with the transmit beam set of {Tx #5, Tx #6} due to the interference 230.

Techniques are described for selecting transmit beam sets in multi-stream environments as part of beam selection procedures. The selection procedures and the reporting procedures of the beam selection procedures may include reporting information about potential sources of interference. The base station 205 may transmit reference signals to the UE 210 as part of a beam sweep of directional beams. The UE 210 may measure signal quality parameters associated with the reference signals and may select a plurality of transmit beam set candidates based on the signal quality parameters. The UE 210 may report to the base station 205 information related to inter-beam interference in multi-stream environments. The base station 205 may determine which transmit beams 215 to use to transmit information to the UE 210 based on the report received from the UE 210 that includes information about inter-beam interference. Although discussed above in the case of a UE with two antenna panels, these techniques may be applied to UEs having any number of antenna panels. In addition, the techniques may be applied to any rank or number of ranks, including rank-1, rank-2, rank-3, rank-4, etc.

Figure 3:
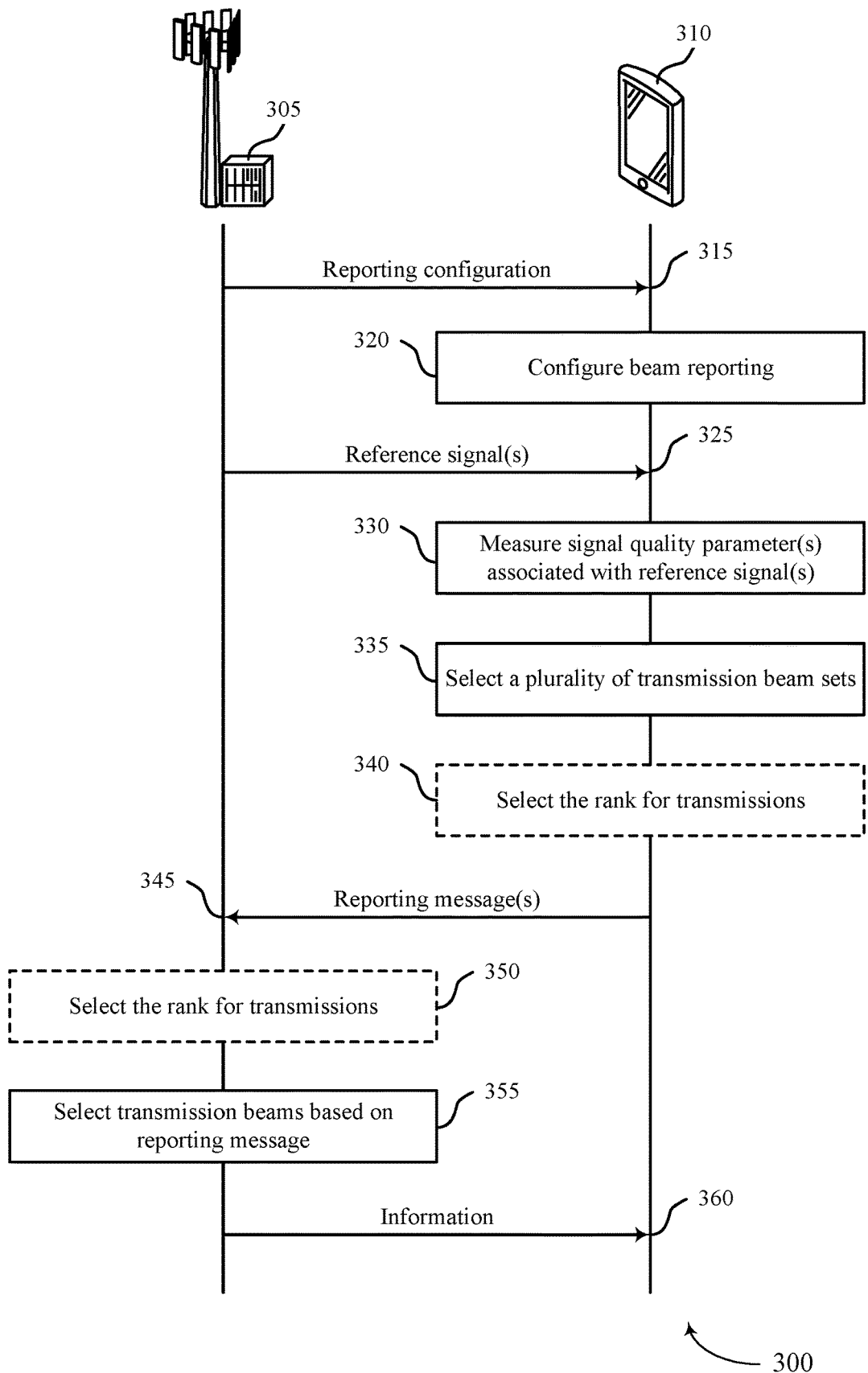
FIG. 3 illustrates an example of a process flow that supports beam selection procedures for multi-stream environments in accordance with aspects of the present disclosure.

FIG. 3 illustrates an example of a process flow 300 that supports beam selection procedures for multi-stream environments in accordance with aspects of the present disclosure. In some examples, the process flow 300 may implement aspects of the wireless communications systems 100 and 200. The process flow 300 may include functions performed and communications exchanged between a base station 305 and a UE 310. The base station 305 may be an example of the base stations 105 and 205 described with reference to FIGS. 1 and 2. The UE 310 may be an example of the UEs 115 and 210 described with reference to FIGS. 1 and 2.

The process flow 300 may illustrate techniques for measuring and reporting information related to interference for beam selection procedures in multi-stream environments. Such techniques may support identifying transmit beam sets that minimize or otherwise reduce inter-beam interference and provide improved (e.g., higher) link quality than other techniques. A transmit beam set may refer to a set of transmit beams composed of a number of transmit beams, which may be related to the rank. For example, for a rank-1 case, the transmit beam set may include a first transmit beam selected for a first antenna panel, a second antenna panel, or both the first and second antenna panels. In another example, for a rank-2 case, the transmit beam set may include a first transmit beam selected for a first antenna panel and a second transmit beam selected for a second antenna panel.

As part of a beam selection procedure, the base station 305 may transmit a reporting configuration message 315 to the UE 310. The reporting configuration message 315 may indicate whether the UE 310 is to measure and/or provide a report associated with multi-stream environments as part of beam selection procedures. The reporting configuration message 315 may indicate information the UE 310 is to measure and report. For example, the reporting configuration message 315 may indicate a type of signal quality parameter (e.g., RSRPs or ratios) the UE 310 is to include in a reporting message 345. In some cases, the reporting configuration message 315 may be an example of system information, downlink control information, or a radio resource control (RRC) message.

At 320, the UE 310 may configure procedures (e.g., beam reporting procedures by the UE 310) based on the information included in the reporting configuration message 315. The UE 310 may identify the information in the reporting configuration message 315.

The base station 305 may transmit one or more reference signals 325 to the UE 310 as part of the beam selection procedure. The reference signals 325 may include a plurality of directional transmit beams transmitted in a plurality of directions as part of a beam sweeping procedure. During a beam selection procedure, the base station 305 may identify one or more transmit beam candidates and sweep through each transmit beam candidate as part of the beam sweeping procedure. Each directional transmit beam may be an example of a reference signal 325 that is transmitted with a consistent set of parameters. The UE 310 may monitor (e.g., listen) for the reference signals 325. The UE 310 may sweep through one or more receive beams when monitoring (e.g., listening) for the reference signals 325. In some cases, the beam sweep procedure may be coordinated such that the UE 310 may measure or attempt to measure multiple combinations (e.g., every possible combination) of transmit beam and receive beam pairs.

At 330, the UE 310 may measure one or more signal quality parameters associated with the reference signals 325. The signal quality parameters may be associated with a transmit-receive (Tx-Rx) beam pair and inter-beam interference between Tx-Rx beam pairs. For example, the UE 310 may measure a first signal quality parameter for first transmit beam and a first receive beam, a second signal quality parameter for a second transmit beam and the first receive beam, a third signal quality parameter for the second transmit beam and a second receive beam, and a fourth signal quality parameter for the first transmit beam and the second receive beam. In an example in which the number of transmit beams in a transmit beam set is represented by M, the UE 310 may measure M number of signal quality parameters for each Tx-Rx beam pair, one for each transmit beam associated with a Tx-Rx beam pair, and M−1 inter-beam interference parameters for interference from other transmit beams of the transmit beam set.

In examples in which the UE 310 includes multiple antenna panels, multiple radio frequency chains, or combinations thereof, the UE 310 may measure the signal quality parameter for each Tx-Rx beam pair for each antenna panel or radio frequency chain. For example, for a Tx-Rx beam pair, the UE 310 may measure a first signal quality parameter received by the first antenna panel (or the first radio frequency chain) and may measure a second signal quality parameter received by the second antenna panel (or the second radio frequency chain). In some aspects, by measuring the signal quality parameter for each antenna panel, the UE 310 may measure information about interference (e.g., an amount of interference) between transmit beams as seen by different panels. The UE 310 may use the measured information to select which transmit beams to include in a transmit beam set.

The signal quality parameter may include a single quantity or a set of quantities. In some cases, the signal quality parameter may be an example of RSRP of the transmit beam at a panel. In some examples, the signal quality parameter may include information about the receive beam used to determine the signal quality parameter. In other examples, the signal quality parameter may not include the information about the receive beam. Examples of signal quality parameters may include RSRP, reference signal received quality (RSRQ), received signal strength indicator (RSSI), a signal-to-noise ratio (SNR), a signal-plus-interference-to-noise ratio (SINR), a signal-to-interference ratio (SIR), or various combinations thereof.

In some examples, the UE 310 may identify signal quality ratios between different transmit beams in a multi-stream environment. In an example in which the UE 310 is operating in a rank-2 environment, the UE 310 may select a first transmit beam candidate for a first antenna panel and a second transmit beam candidate for a second antenna panel. The UE 310 may determine a first signal quality ratio based on a comparison between the signal quality parameter for the first transmit beam candidate at the first antenna panel and the signal quality parameter for the second transmit beam candidate at the first antenna panel. The UE 310 may also determine a second signal quality ratio based on a comparison between the signal quality parameter for the second transmit beam candidate at the second antenna panel and the signal quality parameter for the first transmit beam candidate at the second antenna panel.

Examples of equations for calculating signal quality ratios are provided below with reference to Equation 1 and Equation 2.

$$RSRP(Tx\#2 \text{ at } P0)/RSRP(Tx\#4 \text{ at } P0) \quad (1)$$

In Equation 1, the term P0 may refer to an antenna panel that may be used to measure the respective RSRPs. In an example, the term Tx #2 may refer to a first transmit beam received by a first antenna panel and the term Tx #4 may refer to a second transmit beam received by the first antenna panel. Equation 1 may be used to determine a ratio for any combination of transmit beams as received by any combination of antenna panels. Equation 1 may be an example of a calculation of SIR of transmit beams, in which one of the transmit beams (e.g., the numerator) represents the selected transmit beam for an antenna panel and the other transmit beam (e.g., the denominator) represents a potentially interfering transmit beam for the antenna panel.

$$RSRP(Tx\#2 \text{ at } P0)/(\gamma + RSRP(Tx\#4 \text{ at } P0)) \quad (2)$$

In Equation 2, the term γ may refer to a noise parameter. The term P0 may refer to an antenna panel that may be used to measure the respective RSRPs. In an example, the term Tx #2 may refer to a first transmit beam received by a first antenna panel and the term Tx #4 may refer to a second transmit beam received by the first antenna panel. Equation 2 may be used to determine a ratio for any combination of transmit beams as received by any combination of panels. Equation 2 may be an example of a calculation of SINR of transmit beams, in which one of the transmit beams (e.g., the numerator) represents the selected transmit beam for an antenna panel and the other transmit beam (e.g., the denominator) represents a potentially interfering transmit beam for the antenna panel.

At 335, the UE 310 may select a plurality of transmit beam sets based on receiving the reference signals 325 or measuring the signal quality parameters. The UE 310 may select at least one transmit beam for each antenna panel or radio frequency chain in a rank. The transmit beam set may include the selected transmit beams. In some aspects, the transmit beam set may include transmit beams that may interfere with the selected transmit beams. In some examples, the UE 310 may select a plurality of transmit beams for each rank. In such examples, the base station 305 may be configured to select the transmit beam for each rank from the plurality of transmit beams. In some aspects, the transmit beam set may include plurality of interfering transmit beams associated with each selected transmit beam.

The number of transmit beams to be included in a transmit beam set may be selected based on the rank. For example, for a rank K (e.g., K may be equal to 1, 2, 3, 4, 5, 6, 7, 8, etc.), the UE 310 may select a number N of transmit beam sets, and a transmit beam set may include a number Q of selected transmit beams. In some examples, the number Q of transmit beams in each transmit beam set may be equal to the rank K associated with the transmit beam set. For example, for rank-1, the UE 310 may select one transmit beam to be included in the transmit beam set. For rank-2, the UE 310 may select two transmit beams to include the transmit beam set.

The UE 310 may determine the number N of transmit beam sets selected for a given rank. In some aspects, the number N of transmit beam sets may be selected such that the transmit beam sets have the highest approximate sum rate per rank as defined by Equation 3, Equation 4, or Equation 5, or combinations thereof.

Equation 3 provides an example of determining the number N of transmit beam sets for a rank-1 system.

$$Rate_{approx}^{(Rank-1)}(\{r_1, t\}, \{r_2, t\}) = \log\left(\alpha + \frac{RSRP(r_1, t) + RSRP(r_2, t)}{\beta}\right) \quad (3)$$

In Equation 3, the terms r1 and r2 may refer to receive beams used by the UE 310 and the term t may refer to the transmit beam used by the base station 305. The terms $\alpha$ and $\beta$ may refer to optimization parameters. In some examples, the term $\alpha$ may be 1 or zero. In some examples, the term $\beta$ may refer to a noise power.

Equation 4 provides an example of determining the number N of transmit beam sets for a rank-2 system. Equation 5 provides an alternative example of determining the number N of transmit beam sets for a rank-2 system.

$$Rate_{approx}^{(Rank-2)}(\{r_1, t_1\}, \{r_2, t_2\}) = \sum_{k=1}^{rank} \log\left(\alpha + \frac{RSRP(r_k, t_k)}{\gamma + \sum_{m \neq k}^{2} RSRP(r_k, t_m)}\right) \quad (4)$$

$$Rate_{approx}^{(Rank-2)}(\{r_1, t_1\}, \{r_2, t_2\}) = \prod_{k=1}^{rank}\left(\alpha + \frac{RSRP(r_k, t_k)}{\gamma + \sum_{m \neq k}^{2} RSRP(r_k, t_m)}\right) \quad (5)$$

In Equations 4 and 5, the terms r1 and r2 may refer to receive beams used by the UE 310 and the terms t1 and t2 may refer to the transmit beams used by the base station 305. The terms $\alpha$ and $\beta$ may refer to optimization parameters. In some examples, the term $\alpha$ may be 1 or zero. In some examples, the term $\beta$ and the term $\gamma$ may refer to a noise power. In some examples, the term "rank" may be number equal to the rank of the system, in this example the number may be 2.

In some aspects, Equations 4 and 5 may be applied to ranks higher than rank-2. For example, Equations 4 and 5 may be applied to rank-3, rank-4, rank-5, rank-6, rank-7, rank-8, and so forth.

To identify transmit beams to include in a transmit beam set for a given rank, the UE 310 may use a variety of approaches. In some examples, the UE 310 may use an exhaustive search algorithm. In some examples, the UE 310 may use a greedy search algorithm.

In an exhaustive search algorithm, the UE 310 may evaluate all possible combinations of transmit beams for a selected rank. In an example in which the selected rank is rank-2, the UE 310 may evaluate the signal quality parameters for every combination of transmit beams selected for the first antenna panel and the second antenna panel.

In a greedy search algorithm, the UE 310 may apply a locally optimal choice at each stage with the goal of finding a global optimum value. The UE 310 may initialize the greedy algorithm with a set of candidate transmit beams and other variables. An example of the initialization of a greedy algorithm for a rank-2 example may be represented by Equation 6.

$P=\{0,1\}$: panel index set for the rank-2 example $T=\{0,1,\ldots N_{TxBeams}-1\}$: Transmit beam index set at base station $R_p=\{0,1,\ldots N_{p,RxBeams}-1\}$: UE receive beam index set at UE antenna panel $p$ \quad (6)

From the initialized set, the UE 310 may find the best (e.g., based on criteria, for example, signal quality parameters) Tx-Rx beam pair among the pairs, regardless of the UE antenna panels involved. In some examples, at the n-th iteration, the UE 310 may find the n-th best (e.g., based on the same criteria or additional criteria) transmit beams among the remaining beams. An example of an algorithm for performing such a procedure for a rank-2 system may be represented by Equation 7.

$$(p^{(1)}, r_p^{(1)}, t^{(1)}) = \arg_{p \in P, r_p \in R_p, t \in T} \max RSRP(r_p, t) \quad (7)$$

The UE 310 may determine the second best Tx-Rx beam pair (e.g., based on criteria, for example, signal quality parameters) for the UE antenna panel that has not been selected. An example of an algorithm to perform such a procedure for a rank-2 system may be represented by Equation 8.

$$(p^{(2)}, r_p^{(2)}, t^{(2)}) = \arg_{p \in P/\{p^{(1)}\}, r_p \in R_p, t \in T/\{t^{(1)}\}} \max Rate_{approx}^{Rank-2}(\{r_p^{(1)}, t^{(1)}\}, \{r_p, t\}) \quad (8)$$

The UE 310 may repeat the first selection (an example of which is represented by Equation 7) and the second selection (an example of which is represented by Equation 8) until a selected number of transmit beam sets are selected.

In some examples, as part of the greedy algorithm, the UE 310 may identify a set of transmit beams including the plurality of transmit beams and select (e.g., iteratively) transmit beam sets for the plurality of transmit beam sets. In some examples, the selecting may include selecting, for one of a plurality of antenna panels, a transmit beam having a highest signal quality from the set of transmit beams, selecting, for one or more additional antenna panels of the plurality of antenna panels, a transmit beam having a next-highest signal quality from the set of transmit beams, and removing the selected transmit beams from the set of transmit beams. The UE may continue (e.g., iteratively) the selecting to identify each transmit beam set. An example of the UE 310 identifying a set of transmit beams and selecting transmit beam sets is described herein with reference to FIG. 5A.

In some aspects, Equations 6, 7, and 8 may be applied to ranks higher than rank-2. For example, Equations 6, 7, and 8 may be applied to rank-3, rank-4, rank-5, rank-6, rank-7, rank-8, and so forth.

At 340, the UE 310 may optionally select a rank for future transmissions from the base station 305 to the UE 310. In such examples, the UE 310 may report (e.g., via a reporting message 345) the signal quality parameters, ratios, or other information for the selected rank. In such examples, the reporting message 345 may include an indication of the selected rank. In some examples, the reporting message 345 may include a rank index. In some examples, the reporting message 345 may include one or more transmission configuration indices, which may indicate the rank.

At 350, the base station 305 may optionally select a rank for a future transmission from the base station 305 to the UE 310. In such examples, the UE 310 may report (e.g., via a reporting message 345) the signal quality parameters, ratios, or other information for a plurality of ranks. The base station 305 may select the rank based on the information in the reporting message 345. In some implementations, each rank may have a different number of candidate groups. For example, the information for rank-1 in the reporting message 345 may include N1 transmit beam sets and the information for rank-2 in the reporting message 345 may include N2 transmit beam sets, and so forth.

The UE 310 may generate a reporting message 345 that indicates signal quality parameters for transmit beam sets and information related to inter-beam interference of the plurality of selected transmit beam sets. An example of the fields of the reporting message 345 are described in more detail with reference to FIG. 5B.

In a first example, the reporting message 345 may include the signal quality parameter for each of the selected transmit beams and the signal quality parameter of the interfering transmit beams. For example, in the rank-2 example, the reporting message 345 may include a first field indicating the signal quality parameter at a first antenna panel for a first transmit beam selected for the first antenna panel, a second field indicating the signal quality parameter of a second transmit beam at the first antenna panel (e.g., the beam that interferes with the first transmit beam), a third field indicating the signal quality parameter at a second antenna panel for the second transmit beam selected for the second antenna panel, and a fourth field indicating the signal quality parameter of the first transmit beam at the second antenna panel (e.g., the beam that interferes with the second transmit beam). In the rank-2 example, the reporting message 345 may include two fields for signal quality parameters for each antenna panel (e.g., the first field for the selected transmit beam and the third field for the interfering beam). In higher rank examples, such as rank-3, the reporting message 345 may include a larger number of fields compared to the lower rank examples. For example, in the rank-3 example, the reporting message 345 may include the following information for each antenna panel: a first field indicating the selected transmit beam for this antenna panel, a second field indicating a first interfering beam for this antenna panel, and a third field indicating a second interfering beam for this antenna panel. That is, for the first example, nine total fields may be included in the reporting message 345 for rank-3. Other configurations for rank-2 and other higher ranks are within the scope of this disclosure.

In a second example, the reporting message 345 may include a signal quality ratio based on a comparison between the signal quality parameter of the selected transmit beam and the signal quality parameter of the interfering beam. In some examples, the signal quality ratio may be an example of SIR. Examples of an equation that may be used to determine the signal quality ratio may be described with reference to the Example #2 row of FIG. 5B. In the rank-2 example, the reporting message 345 may include one field for each antenna panel. A first field may be for the ratio associated with the first antenna panel and the second field may be for the ratio associated with the second antenna panel. In some examples, in higher rank examples, such as rank-3, the reporting message 345 may include a single field for each antenna panel. In such examples, the ratio may incorporate interference from multiple potentially interfering beams. In some higher rank examples, such as rank-3, the reporting message 345 may include more than one field for each antenna panel. For example, in the rank-3 example, the reporting message 345 may include the following information for each antenna panel: a first field indicating the ratio between the selected transmit beam and a first interfering beam and a second field indicating the ratio between the selected transmit beam and a second interfering beam. That is, for the second example, six total fields may be included in the reporting message 345 for rank-3. Other configurations for rank-2 and other higher ranks are within the scope of this disclosure.

In a third example, the reporting message 345 may include signal quality ratio based on the signal quality parameter of the selected transmit beam, the signal quality parameter of the interfering beam, and other noise (e.g., represented by $\gamma$ in FIG. 5B). In some examples, the signal quality ratio may be an example of SINR. Examples of an equations that may be used to determine the signal quality ratio may be described with reference to the Example #3 row of FIG. 5B. In the rank-2 example, the reporting message 345 may include one field for each antenna panel. A first field may be for the ratio associated with the first antenna panel and the second field may be for the ratio associated with the second antenna panel. In some examples, in higher rank examples, such as rank-3, the reporting message 345 may include a single field for each antenna panel. In such examples, the ratio may incorporate interference from multiple potentially interfering beams (e.g., a sum of interference from multiple interfering beams and noise $\gamma$. In some higher rank examples, such as rank-3, the reporting message 345 may include more than one field for each antenna panel. For example, in the rank-3 example, the reporting message 345 may include the following information for each antenna panel: a first field indicating the ratio between the selected transmit beam and a first interfering beam (e.g., plus noise $\gamma$) and a second field indicating the ratio between the selected transmit beam and a second interfering beam (e.g., plus noise $\gamma$). That is, for the rank-3 example, the reporting message 345 may include six measurements for a set of three antenna panels (e.g., two measurements for each antenna panel). Other configurations for rank-2 and other higher ranks are within the scope of this disclosure.

At 355, the base station 305 may determine one or more transmit beams to use for transmission based on receiving the reporting message 345. In some aspects, the base station 305 may use the information about inter-beam interference received from the UE 310 as part of the determination. In some other aspects, the base station 305 may use additional information such as scheduling information including inter-cell interference or inter-user interference. In some examples, the base station 305 may apply an approximate sum rate equation similar to one or more equations applied by the UE 310 and described above.

The base station 305 may transmit information 360 to the UE 310 using the selected transmit beams. The information 360 may include, for example, packets or data associated with various information channels (e.g., data channels). In some examples, the UE 310 may select the receive beams used for those transmissions based on the selected transmit beams. In some examples, the base station 305 may communicate the selected transmit beams to the UE 310 using signaling.

Figure 4:
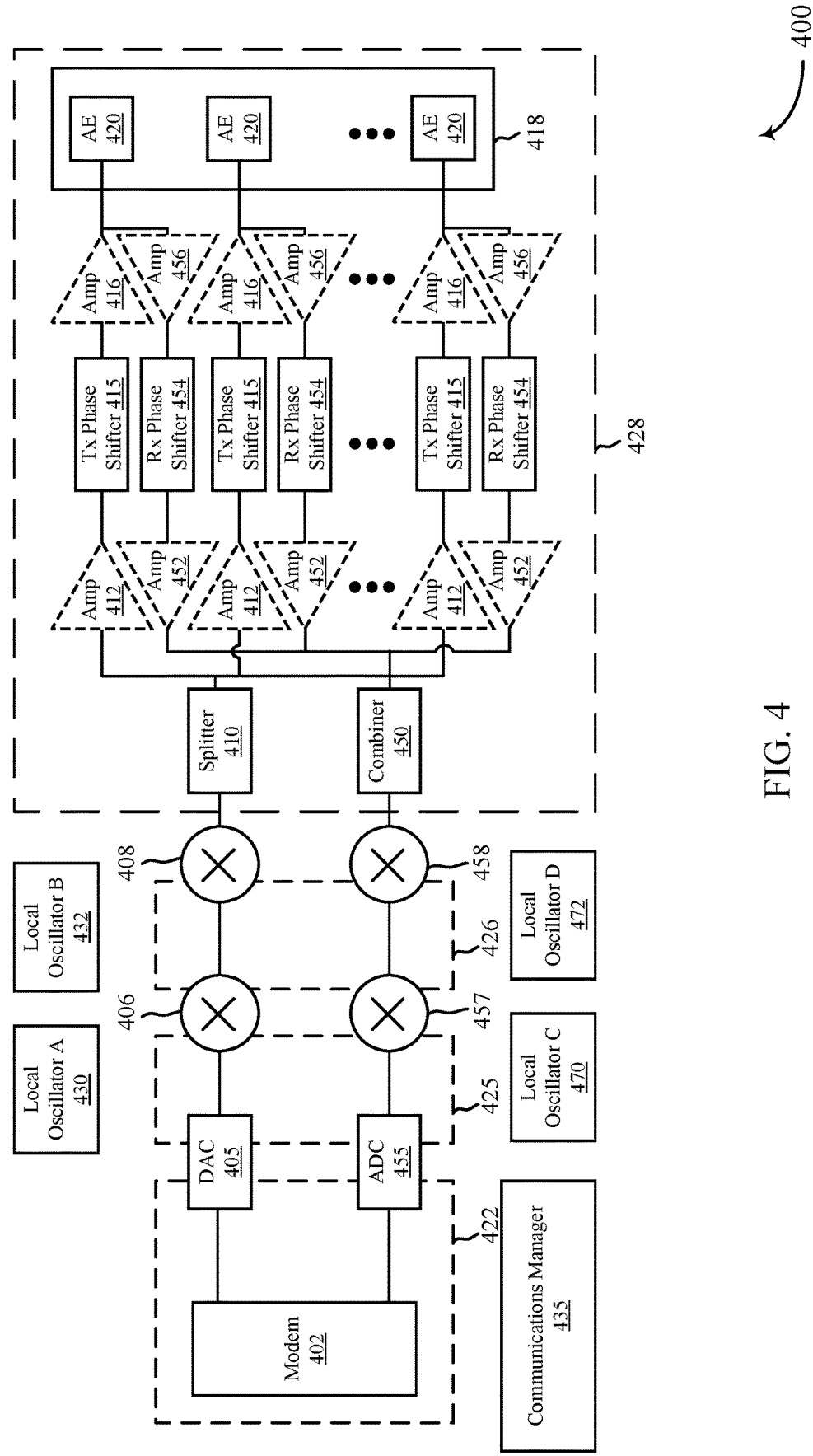
FIG. 4 illustrates an example of an antenna module that supports beam selection procedures for multi-stream environments in accordance with aspects of the present disclosure.

FIG. 4 illustrates an example of an antenna module 400 that supports beam selection procedures for multi-stream environments in accordance with aspects of the present disclosure. In some examples, the antenna module 400 may implement aspects of the wireless communications system 100 or the wireless communications system 200, as described with reference to FIGS. 1 and 2, respectively. In some examples, aspects of antenna module 400 may be an example of the antenna panels 225 as described with reference to FIG. 2. In some examples, the antenna module 400 may be incorporated in a transmitting device or a receiving device (e.g., a UE or a base station), as described herein.

FIG. 4 is a diagram illustrating example hardware components of a wireless device in accordance with example aspects of the disclosure. The illustrated components may include those that may be used for antenna element selection and/or for beamforming for transmission of wireless signals. Further, some components illustrated in FIG. 4 (e.g., modem, communications manager, oscillators, etc.) may be shared with one or more other antenna modules that may be included in a transmitting device or a receiving device. It is noted that there are numerous architectures for antenna element selection and implementing beamforming, an example of which is illustrated here. The antenna module 400 includes a modem (modulator/demodulator) 402, a digital to analog converter (DAC) 405, a first mixer 406, a second mixer 408, and a splitter 410. The antenna module 400 also includes a plurality of first amplifiers 412, a plurality of phase shifters 415, a plurality of second amplifiers 416, and an antenna array 418 that includes a plurality of antenna elements (AEs) 420. Transmission lines or other waveguides, wires, traces, or the like are shown connecting the various components to illustrate how signals to be transmitted may propagate between components. Boxes 422, 425, 426, and 428 indicate regions in the antenna module 400 in which different types of signals propagate or are processed. Specifically, box 422 indicates a region in which digital baseband signals propagate or are processed, box 425 indicates a region in which analog baseband signals propagate or are processed, box 426 indicates a region in which analog intermediate frequency (IF) signals propagate or are processed, and box 428 indicates a region in which analog radio frequency (RF) signals propagate or are processed. The architecture also includes a local oscillator A 430, a local oscillator B 432, and a communications manager 435.

Each of the antenna elements 420 may include one or more sub-elements (not shown) for radiating or receiving RF signals. For example, a single antenna element 420 may include a first sub-element cross-polarized with a second sub-element that can be used to independently transmit cross-polarized signals (e.g., in different ranks or layers). The antenna elements 420 may include patch antennas or other types of antennas arranged in a linear, two-dimensional, or other pattern. A spacing between antenna elements 420 may be such that signals with a desired wavelength transmitted separately by the antenna elements 420 may interact or interfere (e.g., to form a desired beam). For example, given an expected range of wavelengths or frequencies, the spacing may provide a quarter wavelength, half wavelength, or other fraction of a wavelength of spacing between neighboring antenna elements 420 to allow for interaction or interference of signals transmitted by the separate antenna elements 420 within that expected range.

The modem 402 processes and generates digital baseband signals and may also control operation of the DAC 405, the first mixer 406 and the second mixer 408, splitter 410, first amplifiers 412, phase shifters 415, and/or the second amplifiers 416 to transmit signals via one or more or all of the antenna elements 420. The modem 402 may process signals and control operation in accordance with a communications standard such as a wireless standard discussed herein. The DAC 405 may convert digital baseband signals received from the modem 402 (and that are to be transmitted) into analog baseband signals. The first mixer 406 upconverts analog baseband signals to analog IF signals within an IF using the local oscillator A 430. For example, the first mixer 406 may mix the signals with an oscillating signal generated by the local oscillator A 430 to "move" the baseband analog signals to the IF. In some examples some processing or filtering (not shown) may take place at the IF. The second mixer 408 upconverts the analog IF signals to analog RF signals using the local oscillator B 432. Similarly to the first mixer, the second mixer 408 may mix the signals with an oscillating signal generated by the local oscillator B 432 to "move" the IF analog signals to the RF, or the frequency at which signals will be transmitted or received. The modem 402 and/or the communications manager 435 may adjust the frequency of local oscillator A 430 and/or the local oscillator B 432 so that a desired IF and/or RF frequency is produced and used to facilitate processing and transmission of a signal within a desired bandwidth.

In the illustrated antenna module 400, signals upconverted by the second mixer 408 may be split or duplicated into multiple signals by the splitter 410. The splitter 410 in antenna module 400 may split the RF signal into a plurality of identical or nearly identical RF signals, as denoted by its presence in box 428. In other examples, the split may take place with any type of signal including baseband digital, baseband analog, or IF analog signals. Each of these signals may correspond to an antenna element 420. A signal corresponding to a respective antenna element 420 of the antenna array 418 may propagate through and be processed by amplifiers 412, 416, phase shifters 415, and/or other elements corresponding to the respective antenna element 420. In one example, the splitter 410 may be an active splitter that is connected to a power supply and may provide some gain so that RF signals output at the splitter 410 are at a power level equal to or greater than the signal entering the splitter 410. In another example, the splitter 410 may be a passive splitter that is not connected to power supply and the RF signals output at the splitter 410 may be at a power level lower than the RF signal entering the splitter 410.

Resulting RF signals output from the splitter 410 may enter an amplifier, such as a first amplifier 412, or a phase shifter 415 corresponding to an antenna element 420. The first amplifiers 412 and second amplifiers 416 may be included or omitted, for example, based on implementation and are illustrated with dashed lines. In one example implementation, both the first amplifier 412 and second amplifier 416 are present. In another, neither the first amplifier 412 nor the second amplifier 416 is present. In other example implementations, one of the first amplifier 412 or the second amplifier 416 may be present but not the other. In an example in which the splitter 410 is an active splitter, the first amplifier 412 may be omitted. By way of an example in which the phase shifter 415 is an active phase shifter configured to provide a gain, the second amplifier 416 may be omitted. The first amplifiers 412 and second amplifiers 416 may provide a desired level of positive or negative gain. A positive gain (positive dB) may be used to increase an amplitude of a signal for radiation by a specific antenna element 420. A negative gain (negative dB) may be used to decrease an amplitude and/or suppress radiation of the signal by a specific antenna element 420. Each of the first amplifiers 412 and second amplifiers 416 may be controlled independently (e.g., by the modem 402 or communications manager 435) to provide independent control of the gain for each antenna element 420. For example, the modem 402 and/or the communications manager 435 may have at least one control line connected to each of the splitter 410, first amplifiers 412, phase shifters 415, and/or second amplifiers 416 which may be used to configure a gain to provide a desired amount of gain for each component and thus each antenna element 420.

The phase shifter 415 may provide a configurable phase shift or phase offset to a corresponding RF signal to be transmitted. The phase shifter 415 may be a passive phase shifter not directly connected to a power supply. Passive phase shifters, in some cases, may introduce some insertion loss. The second amplifier 416 may boost the signal to compensate for the insertion loss. The phase shifter 415 may be an active phase shifter connected to a power supply such that the active phase shifter provides some amount of gain or prevents insertion loss. The settings of each of the phase shifters 415 may be independent of one another. For example, each of the phase shifters 415 may be set to provide a desired amount of phase shift, the same amount of phase shift, or some other configuration. The modem 402 and/or the communications manager 435 may have at least one control line connected to each of the phase shifters 415 and which may be used to configure the phase shifters 415 to provide a desired amounts of phase shift or phase offset between antenna elements 420.

In the illustrated antenna module 400, RF signals received by the antenna elements 420 may be provided to one or more of a third amplifier 456 to boost the signal strength. The third amplifier 456 may be connected to the antenna array 418 described herein, e.g., for TDD operations. The third amplifier 456 may be connected to different antenna arrays (e.g., different antenna arrays similar to antenna array 418). Each RF signal (with or without amplification by a third amplifier 456) may be input into a phase shifter 454 to provide a configurable phase shift or phase offset for the RF signal. The phase shifter 454 may be an active phase shifter or a passive phase shifter. The settings of the phase shifters 454 may be independent of one another. For example, each of the phase shifters 454 may be set to provide a desired amount of phase shift, the same amount of phase shift, or some other configuration. The modem 402 and/or the communications manager 435 may have at least one control line connected to each of the phase shifters 454 and which may be used to configure the phase shifters 454 to provide a desired amount of phase shift or phase offset between antenna elements 420.

The outputs of the phase shifters 454 (e.g., phase shifted RF signals) may be input to one or more fourth amplifiers 452 for signal amplification. The fourth amplifiers 452 may be individually configured to provide a configured amount of gain. The fourth amplifiers 452 may be individually configured to provide an amount of gain to ensure that the signals input to combiner 450 from the fourth amplifiers 452 have the same magnitude. The fourth amplifiers 452 and/or third amplifiers 456 may be included or omitted, for example, based on implementation and are illustrated in dashed lines. In one example implementation, both the fourth amplifier 452 and the third amplifier 456 may be present. In another, neither the fourth amplifier 452 nor the third amplifier 456 may be present. In other example implementations, one of the fourth amplifier 452 or the third amplifier 456 may be present but not the other.

In the illustrated antenna module 400, signals output by the phase shifters 454 (via the fourth amplifiers 452 when present) may be combined at combiner 450. The combiner 450 in architecture combines the RF signal into a signal, as denoted by the presence of the combiner 450 in box 428. The combiner 450 may be a passive combiner, e.g., not connected to a power source, which may result in some insertion loss. The combiner 450 may be an active combiner, e.g., connected to a power source, which may result in some signal gain. In an example in which the combiner 450 is an active combiner, the combiner 450 may provide a different (e.g., configurable) amount of gain for each input signal so that the input signals have the same magnitude when they are combined. In an example in which the combiner 450 is an active combiner (e.g., capable of providing the signal amplification), the fourth amplifier 452 may be omitted.

The output of the combiner 450 may be input into mixers 458 and 457. Mixers 458 and 457 may generally down convert the received RF signal using inputs from local oscillator D 472 and local oscillator C 470, respectively, to create intermediate or baseband signals that carry the encoded and modulated information. The output of the mixers 458 and 457 may be input into an analog-to-digital converter (ADC) 455 for conversion to analog signals. The analog signals output from ADC 455 may be input to modem 402 for baseband processing, e.g., decoding, de-interleaving, etc.

The antenna module 400 is described by way of example to illustrate an architecture for transmitting and/or receiving signals. It will be understood that the antenna module 400 and/or each portion of the antenna module 400 may be repeated multiple times within an architecture to accommodate or provide an arbitrary number of RF chains, antenna elements, and/or antenna panels. More generally, in one example implementation of an antenna panel, an antenna panel can include any set of antenna elements that are subject to the same power control. As such, all antenna elements 420 included in antenna array 418 may be an example of an antenna panel. An antenna panel may also include a virtual antenna panel, for example, where one or more antenna elements 420 are controllable by two different circuits. In an example in which n separate circuits similar to the chain shown in FIG. 4 of DAC 405, mixer 406, mixer 408, splitter 410, first amplifier 412, transmit phase shifter 415, and/or second amplifier 416 under the control of modem 402 or communications manager 435 (and, similarly third amplifier 456, receive phase shifter 454, fourth amplifier 452, combiner 450, mixer 458, mixer 457, and/or ADC 455 under the control of modem 402 or communications manager 435) are connected to one or more antenna elements 420, there may be n virtual antenna panels, even in cases in which there n antenna arrays or less. Additionally, or alternatively, a beam-forming network may include circuits capable of forming a beam in an array of antennas, such as, for example, DAC 405, mixer 406, mixer 408, splitter 410, first amplifier 412, transmit phase shifter 415, and/or second amplifier 416 under the control of modem 402 or communications manager 435 (and, similarly third amplifier 456, receive phase shifter 454, fourth amplifier 452, combiner 450, mixer 458, mixer 457, and/or ADC 455 under the control of modem 402 or communications manager 435). Such a beam-forming network may be connected to a plurality of antenna elements. A given plurality of antenna elements controllable by n beam-forming networks may define n virtual antenna panels. Furthermore, numerous alternate architectures may be possible and contemplated.

For example, although a single antenna array 418 is shown, two, three, or more antenna arrays may be included, each including one or more corresponding amplifiers, phase shifters, splitters, mixers, DACs, ADCs, and/or modems. For example, a single UE may include two, three, four, or more antenna panels or virtual antenna panels for transmitting or receiving signals at different physical locations on the UE or in different directions. Furthermore, mixers, splitters, amplifiers, phase shifters and other components may be located in different signal type areas (e.g., different ones of the boxes 422, 425, 426, and/or 428) in different implemented architectures. For example, the signal to be transmitted may be split into a plurality of signals at any of the analog RF, analog IF, analog baseband, or digital baseband frequencies in different examples. Similarly, amplification, and/or phase shifts may also take place at different frequencies. For example, in some contemplated implementations, one or more of the splitter 410, first amplifiers 412, second amplifiers 416, or phase shifters 415 may be located between the DAC 405 and the first mixer 406 or between the first mixer 406 and the second mixer 408.

In one example, the functions of one or more of the components may be combined into one component. For example, the phase shifters 415 may perform amplification, and any of the first amplifiers 412 and/or second amplifiers 416 may be included or omitted. By way of another example, a phase shift may be implemented by the second mixer 408 such that a separate phase shifter 415 may be omitted. This technique is sometimes called local oscillator (LO) phase shifting. In one example implementation of this configuration, there may be a plurality of IF to RF mixers (e.g., for each antenna element chain) within the second mixer 408 and the local oscillator B 432 may supply different local oscillator signals (with different phase offsets) to each IF to RF mixer.

The modem 402 and/or the communications manager 435 may control one or more of the other components of FIG. 4 to select one or more antenna elements 420 and/or to form beams for transmission of one or more signals. For example, the antenna elements 420 may be individually selected or deselected for transmission of a signal (or signals) by controlling an amplitude of one or more corresponding amplifiers, such as the first amplifiers 412 and/or the second amplifiers 416. Beamforming includes generation of a beam using a plurality of signals on different antenna elements in which one or more or all of the plurality signals are shifted in phase relative to each other. The formed beam may carry physical or higher layer reference signals or information. As each signal of the plurality of signals is radiated from a respective antenna element 420, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 418) may be dynamically controlled by modifying the phase shifts or phase offsets imparted by the phase shifters 415 and amplitudes imparted by the first amplifiers 412 and/or second amplifiers 416 of the plurality of signals relative to each other.

In some examples, a number of antenna panels (such as antenna modules 400) may be present at a UE, and each of the multiple antenna panels may have an associated set of beams that may be supported at the antenna panel, as discussed herein.

FIGS. 5A and 5B illustrate an example of transmit beam sets and the contents of a reporting message that support beam selection procedures for multi-stream environments in accordance with aspects of the present disclosure. FIG. 5A represents a transmit beam set for a rank-2 example and FIG. 5B represents different examples of fields and information that may be included in a reporting message (e.g., reporting message 345 described with reference to FIG. 3) based on the selected transmit beams shown in FIG. 5A.

FIG. 5A illustrates an example diagram 505 that supports beam selection procedures for multi-stream environments in accordance with aspects of the present disclosure. The diagram 505 includes Tx-Rx beam pairs for a transmit beam set that includes six transmit beams (e.g., Tx beam 0 through Tx beam 5), a first receive beam set at a first antenna panel (e.g., UE Rx panel 0) that includes three receive beams (e.g., Rx beam 0 through Rx beam 2) and a second receive beam set at a second antenna panel (e.g., UE Rx panel 1) that includes three receive beams (e.g., Rx beam 0 through Rx beam 2). The illustrative example of diagram 505 is for a rank-2 example. The features of this example may be applied to higher rank examples (e.g., rank-3, rank-4, rank-5, rank-6, rank-7, rank-8 examples, and so forth).

The diagram 505 indicates that a UE selected a first transmit beam (e.g., Tx beam 2) for the first antenna panel (e.g., UE Rx panel 0) and a second transmit beam (e.g., Tx beam 4) for the second antenna panel (e.g., UE Rx panel 1). For example, as part of the greedy algorithm described herein, the UE may identify a set of transmit beams including a plurality of transmit beams (e.g., Tx beam 0 through Tx beam 5) and select (e.g., iteratively) transmit beam sets for a plurality of transmit beam sets. In some examples, the selecting may include selecting, for one of a plurality of antenna panels (e.g., UE Rx panel 0), a transmit beam having a highest signal quality (e.g., Tx beam 2) from the set of transmit beams, selecting, for one or more additional antenna panels (e.g., UE Rx panel 1) of the plurality of antenna panels, a transmit beam having a next-highest signal quality (e.g., Tx beam 4) from the set of transmit beams, and removing the selected transmit beams from the set of transmit beams. The UE may continue (e.g., iteratively) the selecting to identify each transmit beam set.

In multi-stream environment, the base station may transmit using both the first transmit beam and the second transmit beam at the same time. Hence, the first antenna panel using a first receive beam may detect some interference from the second transmit beam and the second antenna panel using the second receive beam may detect some interference from the first transmit beam. The diagram 505 visually depicts example relationships between the selected transmit beams and the inter-beam interference that may be detected by the UE.

FIG. 5B illustrates examples of a reporting message 550 that support beam selection procedures for multi-stream environments in accordance with aspects of the present disclosure. The reporting message 550 includes fields for three different examples (e.g., Example #1, Example #2, and Example #3) for reporting the rank-2 example described with reference to FIG. 5A. The reporting message 550 may be an example of the reporting message 345 described with reference to FIG. 3. The illustrative example of the reporting message is for a rank-2 example. The features of this example may be applied to higher rank examples (e.g., rank-3, rank-4, rank-5, rank-6, rank-7, rank-8 examples, and so forth). In some cases, the ratio examples (e.g., examples 2 and 3) described herein may provide more efficient reporting compared to some beam selection procedures. For example, using the ratio examples described herein, the number of selected transmit beams $N_{TxBeams}$ to the number of measurements $N_M$ may be as follows: $\{N_{TxBeams}, N_M\}=\{2,2\}, \{3, 6\}, \{4,12\}$, such that exponential growth may be equal to $((N_{TxBeams}-1) \times N_{TxBeams})$. In contrast, in some beam selection procedures, the number of selected transmit beams $N_{TxBeams}$ to the number of measurements $N_M$ may be as follows: $\{N_{TxBeams}, N_M\}=\{2,4\}, \{3,9\}, \{4,16\}$, such that exponential growth may be equal to $(N_{TxBeams})^2$. In some examples, the reporting message 550 may include fields for a single example (e.g., Example #1, Example #2, or Example #3). In some examples, the reporting message 550 may include fields from multiple examples at the same time.

The first example (e.g., Example #1) may include fields for separately reporting the signal quality parameter for each selected transmit beam and each interfering transmit beam. The first example (e.g., Example #1) may correspond to the first example of the reporting message 345 described with reference to FIG. 3.

The second example (e.g., Example #2) may include fields that report a signal quality ratio for each antenna panel. The second example (e.g., Example #2) may correspond to the second example of the reporting message 345 described with reference to FIG. 3.

The third example (e.g., Example #3) may include fields that report a signal quality ratio for each antenna panel. The term γ in the equation may refer to a noise coefficient. The third example (e.g., Example #3) may correspond to the third example of the reporting message 345 described with reference to FIG. 3.

Figure 6:
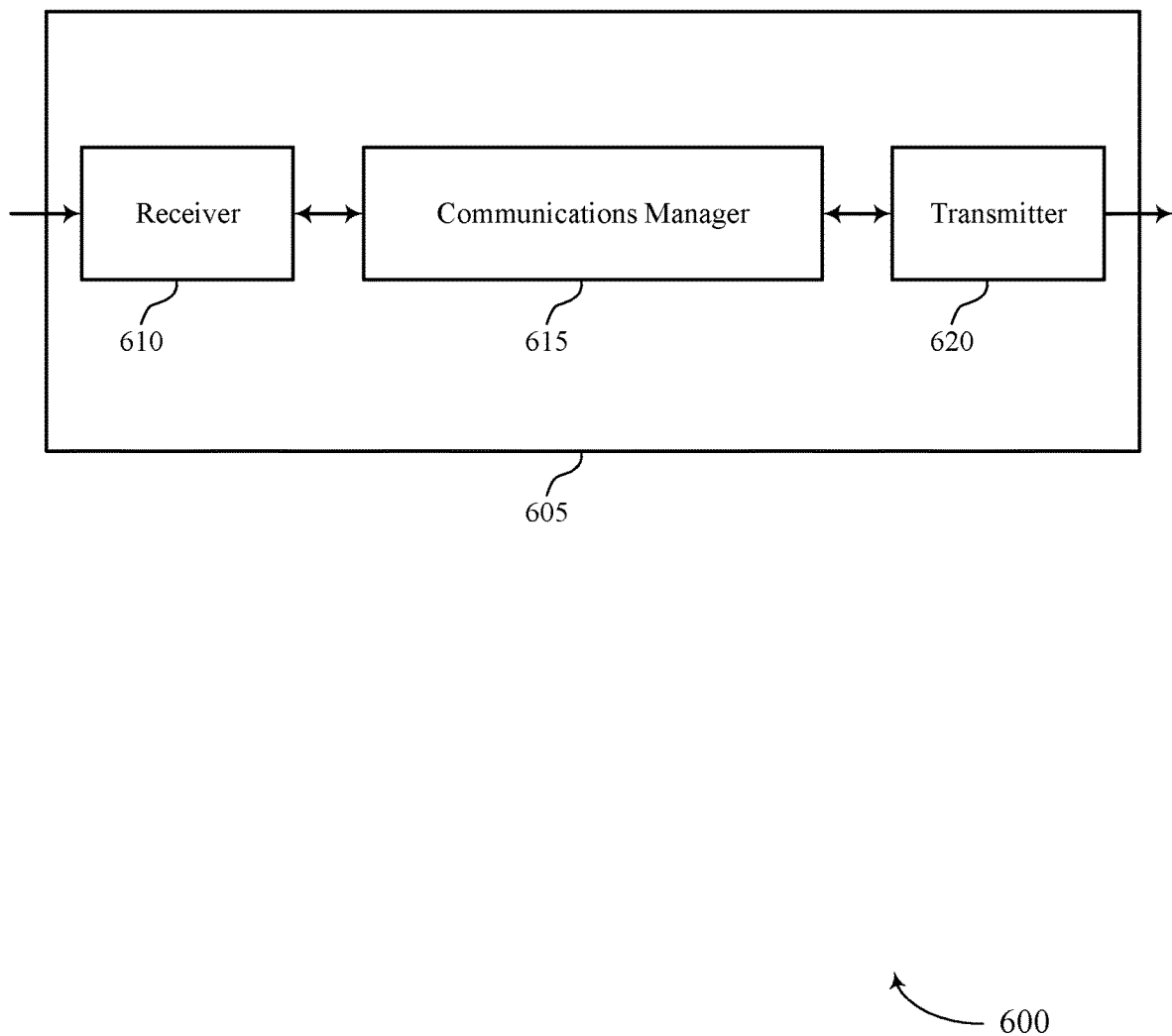
FIGS. 6 and 7 show block diagrams of devices that support beam selection procedures for multi-stream environments in accordance with aspects of the present disclosure.

FIG. 6 shows a block diagram 600 of a device 605 that supports beam selection procedures for multi-stream environments in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to beam selection procedures for multi-stream environments, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, reference signals associated with a set of transmit beams, select a set of transmit beam sets associated with a beam selection procedure based on receiving one or more of the reference signals, where the set of transmit beam sets includes a first transmit beam set including a first transmit beam associated with a first receive beam and a second transmit beam associated with a second receive beam, and transmit, to the base station based on selecting the set of transmit beam sets, a message indicating signal quality information for each transmit beam set of the set of transmit beam sets, where the signal quality information for the first transmit beam set is based on a first signal quality parameter associated with receiving the first transmit beam via the first receive beam and a second signal quality parameter associated with receiving the second transmit beam via the first receive beam. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
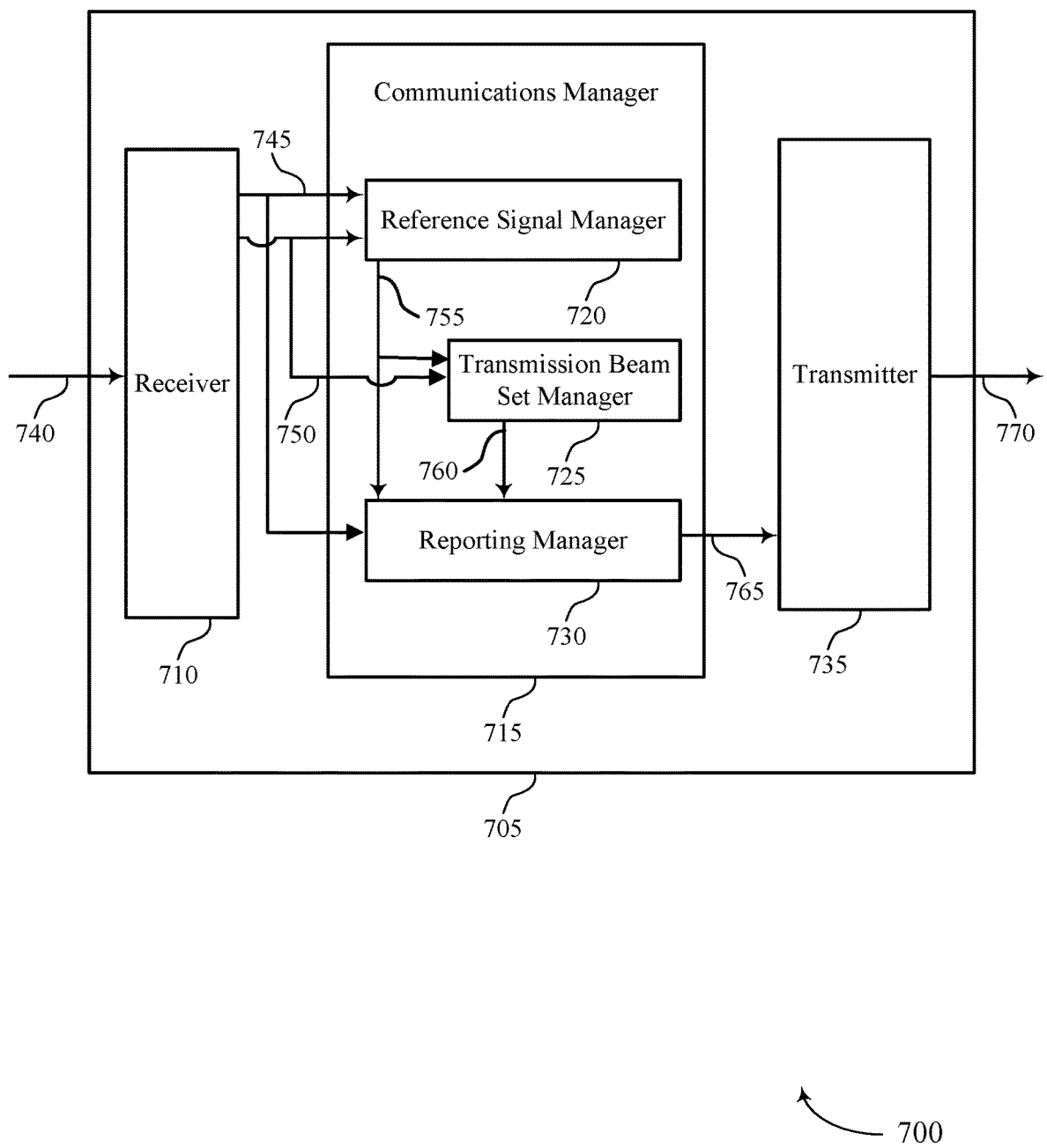

FIG. 7 shows a block diagram 700 of a device 705 that supports beam selection procedures for multi-stream environments in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive signaling 740 such as packets, user data, or control information associated with various information channels (e.g., control channels, data channels, and information related to beam selection procedures for multi-stream environments, etc.). The signaling 740 may include a reporting configuration message which may include a set of bits indicating whether the device 705 is to measure or provide a report associated with multi-stream environments as part of beam selection procedures. In some aspects, the reporting configuration message may include a set of bits indicating information the device 705 is to measure and report. For example, the reporting configuration message may include a set of bits indicating a type of signal quality parameter (e.g., RSRPs or ratios) the device 705 is to include in a reporting message (e.g., reporting message 765). In some cases, the reporting configuration message may be an example of system information, downlink control information, or a RRC message. The reporting configuration message may include examples of aspects of reporting configuration message 315 described with reference to FIG. 3.

The information in signaling 740 received from another device (e.g., a base station 105) may be passed on to other components of the device 705, such as the communications manager 715. For example, the receiver 710 may provide the reporting configuration message 745 to the communications manager 715. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a reference signal manager 720, a transmit beam set manager 725, and a reporting manager 730. The communications manager 715 may be an example of aspects of the communications manager 910 described herein.

The reference signal manager 720 may receive, from a base station (e.g., via receiver 710), reference signals associated with a set of transmit beams. For example, signaling 740 may include reference signals associated with the set of transmit beams. The reference signal manager 720 may receive, from the receiver 710, the reference signals 750. The reference signal manager 720 may output reference signal information 755 to the reporting manager 730 and the transmit beam set manager 725. The reference signal information 755 may include a set of bits indicating values of the reference signals 750. The reference signal information 755 may include a set of bits indicative of signal characteristics (e.g., amplitude, phase, frequency, waveform) of the reference signals 750.

The transmit beam set manager 725 may select a set of transmit beam sets associated with a beam selection procedure based on receiving one or more of the reference signals, where the set of transmit beam sets includes a first transmit beam set including a first transmit beam associated with a first receive beam and a second transmit beam associated with a second receive beam. For example, the transmit beam set manager 725 may receive, from the receiver 710, the reference signals 750. In some aspects, the transmit beam set manager 725 may receive, from the reference signal manager 720, the reference signal information 755. The transmit beam set manager 725 may select the set of transmit beam sets based on the reference signals 750, the reference signal information 755, or both. The transmit beam set manager 725 may output beam selection information 760 to the reporting manager 730 indicating the selected set of transmit beam sets. The beam selection information 760 may include a set of bits indicating the beam sets and the beams included in the beam sets (e.g., a set of bits indicating identifiers associated with the beams and the beam sets).

The reporting manager 730 may transmit, to the base station based on selecting the set of transmit beam sets, a message indicating signal quality information for each transmit beam set of the set of transmit beam sets, where the signal quality information for the first transmit beam set is based on a first signal quality parameter associated with receiving the first transmit beam via the first receive beam and a second signal quality parameter associated with receiving the second transmit beam via the first receive beam. The reporting manager 730 may receive, from the transmit beam set manager 725, the beam selection information 760 indicating the selected set of transmit beam sets. The reporting manager 730 may receive, from the receiver 710, the reporting configuration message 745. The reporting manager 730 may pass a reporting message 765 indicating the selected set of transmit beam sets to other components of the device 705 for processing. The reporting message 765 may include a set of bits indicating the selected set of transmit beam sets. The reporting message 765 may include a set of bits indicating the selected set of transmit beam sets and signal quality information for each of the transmit beam sets. In some cases, the reporting manager 730 may pass the reporting message 765 (or other information based on information included in the reporting message 765) to the transmitter 735.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas. In an example, the transmitter 735 may receive the reporting message 765 and may identify time-frequency resources over which the reporting message 765 is to be transmitted. The transmitter 1135 may modulate the information over the identified time-frequency resources in order to transmit the reporting message 765.

Figure 8:
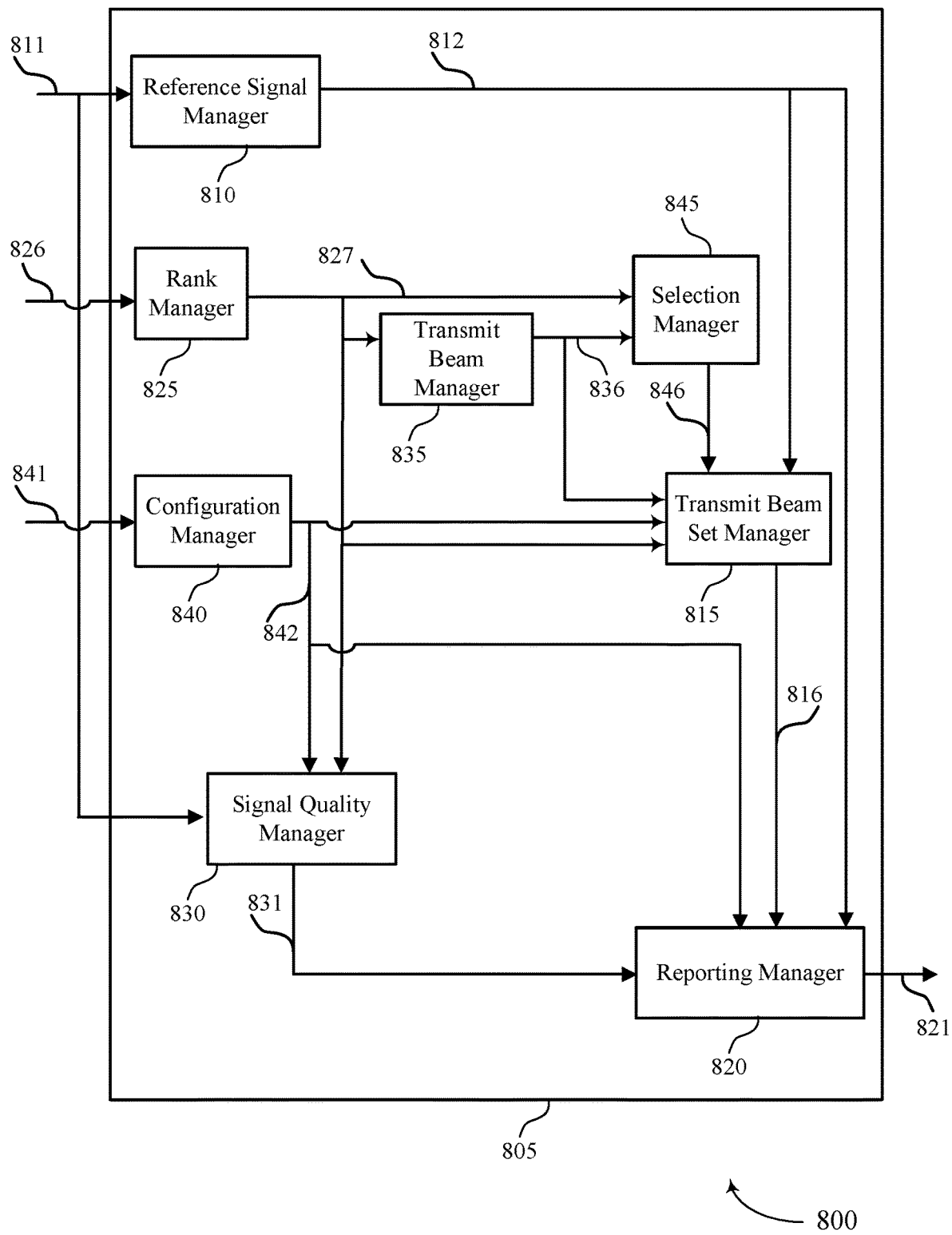
FIG. 8 shows a block diagram of a communications manager that supports beam selection procedures for multi-stream environments in accordance with aspects of the present disclosure.

FIG. 8 shows a block diagram 800 of a communications manager 805 that supports beam selection procedures for multi-stream environments in accordance with aspects of the present disclosure. The communications manager 805 may be an example of aspects of a communications manager 615, a communications manager 715, or a communications manager 910 described herein. The communications manager 805 may include a reference signal manager 810, a transmit beam set manager 815, a reporting manager 820, a rank manager 825, a signal quality manager 830, a transmit beam manager 835, a configuration manager 840, and a selection manager 845. Each of these modules may communicate, directly or indirectly, with one another (e.g., via one or more buses).

The reference signal manager 810 may receive, from a base station (e.g., via the receiver 710), information 811 such as packets, user data, or control information associated with various information channels (e.g., control channels, data channels, and information related to retuning for flexible resource allocation, etc.). In an example, the information 811 may include reference signals associated with a set of transmit beams (e.g., reference signals 750). In some examples, the reference signal manager 810 may receive a first reference signal at a first antenna panel coupled with a radio frequency chain. In some examples, the reference signal manager 810 may receive a second reference signal at a second antenna panel coupled with a second radio frequency chain.

In some aspects, the reference signal manager 810 may output reference signal information 812 to the reporting manager 820 and the transmit beam set manager 815. The reference signal information 812 may include a set of bits indicating values of the reference signals. The reference signal information 812 may include a set of bits indicative of signal characteristics (e.g., amplitude, phase, frequency, waveform) of the reference signals.

The transmit beam set manager 815 may select a set of transmit beam sets associated with a beam selection procedure based on receiving one or more of the reference signals, where the set of transmit beam sets includes a first transmit beam set including a first transmit beam associated with a first receive beam and a second transmit beam associated with a second receive beam. In some cases, the signal quality information for the first transmit beam set is based on a third signal quality parameter associated with receiving the second transmit beam via the second receive beam and a fourth signal quality parameter associated with receiving the first transmit beam via the second receive beam. In some cases, the first transmit beam is selected for a first antenna panel and the second transmit beam is selected for a second antenna panel.

In some aspects, the transmit beam set manager 815 may receive, from the reference signal manager 810, the reference signal information 812. The transmit beam set manager 815 may select the set of transmit beam sets based on the reference signal information 812, the transmission information 836, and the selection information 846. The transmit beam set manager 815 may output beam selection information 816 to the reporting manager 820 indicating the selected set of transmit beam sets. The beam selection information 816 may include a set of bits indicating the beam sets and the beams included in the beam sets (e.g., a set of bits indicating identifiers associated with the beams and the beam sets).

The reporting manager 820 may transmit, to the base station based on selecting the set of transmit beam sets, a message indicating signal quality information for each transmit beam set of the set of transmit beam sets, where the signal quality information for the first transmit beam set is based on a first signal quality parameter associated with receiving the first transmit beam via the first receive beam and a second signal quality parameter associated with receiving the second transmit beam via the first receive beam. In some cases, the message includes a first field indicating the first signal quality parameter, a second field indicating the second signal quality parameter, a third field indicating the third signal quality parameter, and a fourth field indicating the fourth signal quality parameter. In some examples, the reporting manager 820 may receive, from the transmit beam set manager 815, the beam selection information 816 indicating the selected set of transmit beam sets. The reporting manager 820 may receive, from the configuration manager 840, the reporting configuration information 842. The reporting manager 820 may output a reporting message 821 indicating the selected set of transmit beam sets. The reporting message 821 may include a set of bits indicating the selected set of transmit beam sets and signal quality information for each of the transmit beam sets.

The rank manager 825 may receive, from the base station (e.g., via the receiver 710), information 826 such as packets, user data, or control information associated with various information channels (e.g., control channels, data channels, and information related to retuning for flexible resource allocation, etc.). In an example, the information 826 may include one or more transmissions. The rank manager 825 may identify a set of ranks for the one or more transmissions, where selecting the set of transmit beam sets (e.g., at the transmit beam set manager 815) includes selecting one or more transmit beam sets for each rank of the set of ranks. In some examples, the rank manager 825 may select a rank from a set of ranks for reporting to the base station, where the signal quality information of the message includes signal quality information associated with the selected rank of the set of ranks. In some examples, the rank manager 825 may identify transmission configuration indices associated with the set of transmit beams, where the reporting message 821 output at the reporting manager 820 indicates a selected subset of the transmission configuration indices. In some examples, the rank manager 825 may output rank information 827 to the selection manager 845, the transmit beam manager 835, and the signal quality manager 830. The rank information 827 may include a set of bits indicating the set of ranks for the one or more transmissions. In some aspects, the rank information 827 may include a set of bits indicating the transmission configuration indices.

The signal quality manager 830 may identify a first signal quality ratio between the first signal quality parameter and the second signal quality parameter and a second signal quality ratio between the third signal quality parameter and the fourth signal quality parameter, where the reporting message 821 includes a first field indicating the first signal quality ratio and a second field indicating the second signal quality ratio.

In some examples, the signal quality manager 830 may receive from the base station (e.g., via the receiver 710), information 811 such as packets, user data, or control information associated with various information channels (e.g., control channels, data channels, and information related to retuning for flexible resource allocation, etc.). In an example, the information 811 may include the reference signals associated with a set of transmit beams (e.g., reference signals 750). The signal quality manager 830 may identify a first signal quality ratio between the first signal quality parameter and a combination of the second signal quality parameter and a first noise measurement associated with the first receive beam and a second signal quality ratio between the third signal quality parameter and a combination of the fourth signal quality parameter and a second noise measurement associated with the second receive beam, where the reporting message 821 output at the reporting manager 820 includes a first field indicating the first signal quality ratio and a second field indicating the second signal quality ratio. In some cases, the first receive beam is associated with a first antenna panel of the user equipment and the second receive beam is associated with a second antenna panel of the user equipment.

In some cases, the signal quality information of the reporting message 821 includes signal quality information 831 associated with each rank of a set of ranks for one or more transmissions. In some examples, the signal quality manager 830 may receive rank information 827 from the rank manager 825 indicating the set of ranks for the one or more transmissions. In some examples, the signal quality manager 830 may receive the reporting configuration information 842 from the configuration manager 840. In some examples, the signal quality manager 830 may output signal quality information 831 to the reporting manager 820. The signal quality information 831 may include a set of bits indicating signal quality metrics (e.g., signal quality ratios).

The transmit beam manager 835 may identify a rank for one or more transmissions. In some examples, the transmit beam manager 835 may identify a quantity of transmit beams in each transmit beam set of the set of transmit beam sets based on identifying the rank, where selecting the set of transmit beam sets (e.g., at the transmit beam set manager 815) is based on identifying the quantity of transmit beams in each transmit beam set. In some examples, the transmit beam manager 835 may receive rank information 827 from the rank manager 825 indicating the set of ranks for the one or more transmissions. The transmit beam manager 835 may output transmission information 836 including a set of bits indicating the identified rank(s) for a transmission(s). In some aspects, the transmission information 836 may include a set of bits indicating the identified quantity of transmit beams in each transmit beam set.

The configuration manager 840 may receive, from the base station (e.g., via the receiver 710), information 841 such as packets, user data, or control information associated with various information channels (e.g., control channels, data channels, and information related to retuning for flexible resource allocation, etc.). In an example, the information 841 may include a reporting configuration for the beam selection procedure, where selecting the set of transmit beam sets at the transmit beam set manager 815 is based on receiving the reporting configuration. In some aspects, the configuration manager 840 may output reporting configuration information 842 to the transmit beam set manager 815, the signal quality manager 830, and the reporting manager 820. The reporting configuration information 842 may include a set of bits indicating the reporting configuration.

The selection manager 845 may evaluate each combination of each the set of transmit beams received via each of a set of receive beams, where selecting the set of transmit beam sets at the transmit beam set manager 815 is based on evaluating each combination. In some examples, the selection manager 845 may identify a set of transmit beams including the set of transmit beams. In some examples, the selection manager 845 may select transmit beam sets for the set of transmit beam sets. In some examples, the selection manager 845 may select, for one or more additional antenna panels of the set of antenna panels, a transmit beam having a next-highest signal quality from the set of transmit beams. In some examples, the selection manager 845 may remove the selected transmit beams from the set of transmit beams. In some examples, the selection manager 845 may receive rank information 827 from the rank manager 825 indicating the set of ranks for the one or more transmissions. The selection manager 845 may output selection information 846 including a set of bits indicating the selected transmit beam sets.

Figure 9:
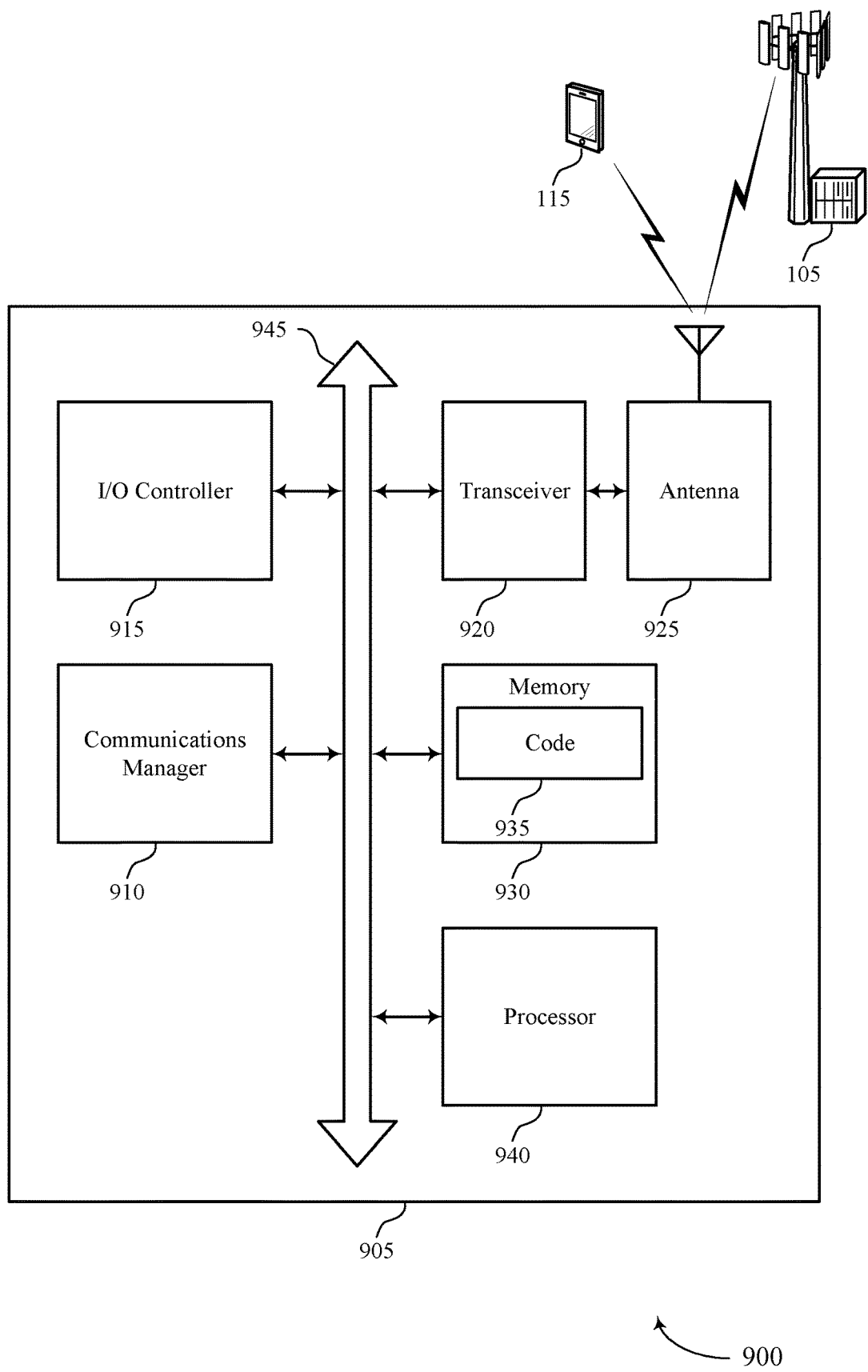
FIG. 9 shows a diagram of a system including a device that supports beam selection procedures for multi-stream environments in accordance with aspects of the present disclosure.

FIG. 9 shows a diagram of a system 900 including a device 905 that supports beam selection procedures for multi-stream environments in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, reference signals associated with a set of transmit beams, select a set of transmit beam sets associated with a beam selection procedure based on receiving one or more of the reference signals, where the set of transmit beam sets includes a first transmit beam set including a first transmit beam associated with a first receive beam and a second transmit beam associated with a second receive beam, and transmit, to the base station based on selecting the set of transmit beam sets, a message indicating signal quality information for each transmit beam set of the set of transmit beam sets, where the signal quality information for the first transmit beam set is based on a first signal quality parameter associated with receiving the first transmit beam via the first receive beam and a second signal quality parameter associated with receiving the second transmit beam via the first receive beam.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting beam selection procedures for multi-stream environments).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
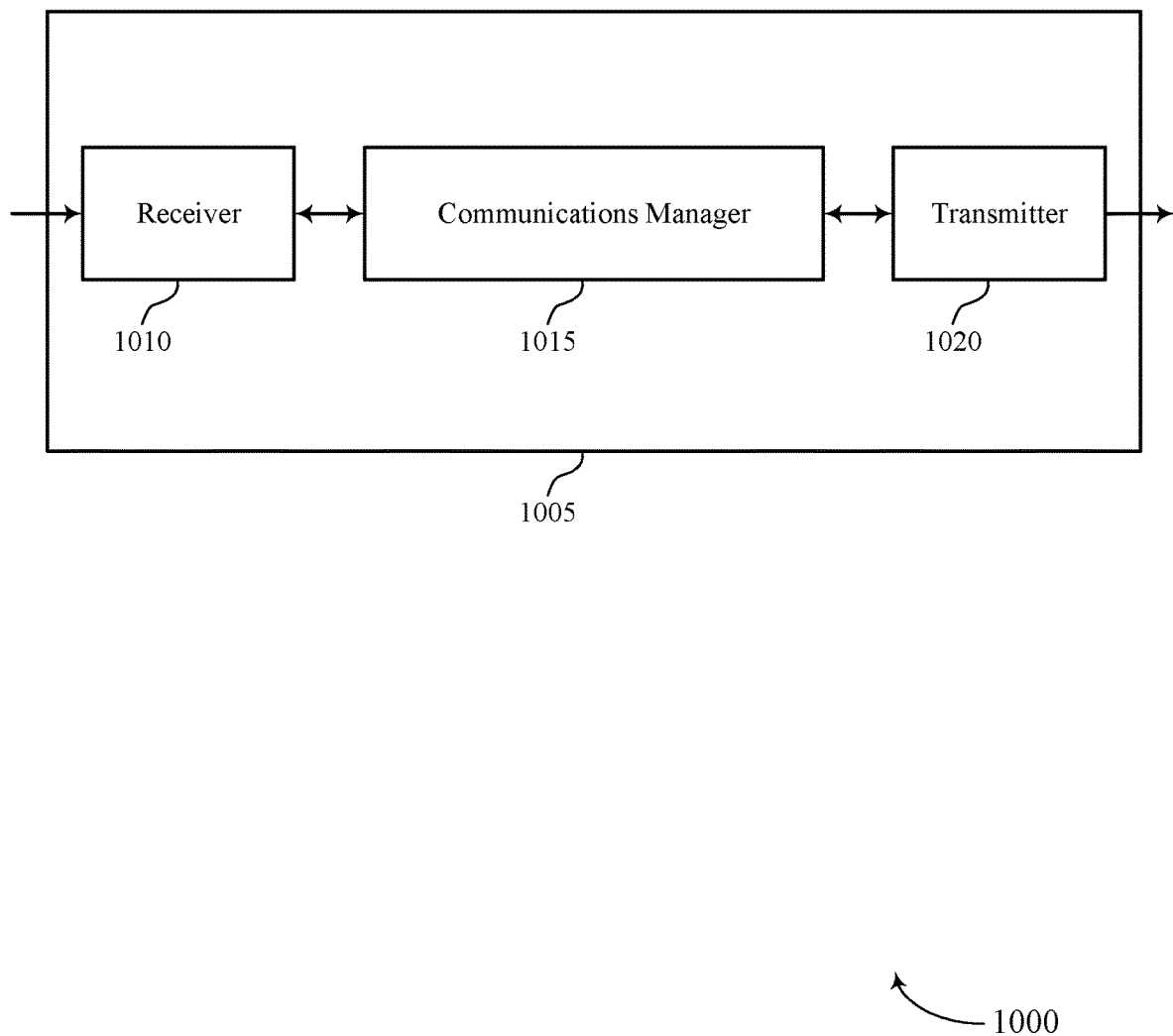
FIGS. 10 and 11 show block diagrams of devices that support beam selection procedures for multi-stream environments in accordance with aspects of the present disclosure.

FIG. 10 shows a block diagram 1000 of a device 1005 that supports beam selection procedures for multi-stream environments in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to beam selection procedures for multi-stream environments, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive, from a user equipment, a message indicating signal quality information for a set of transmit beam sets, where the signal quality information of a first transmit beam set including a first transmit beam and a second transmit beam is based on a first signal quality parameter associated with receiving the first transmit beam via a first receive beam and a second signal quality parameter associated with receiving the second transmit beam via the first receive beam, select one or more transmit beams from the set of transmit beam sets for communicating information with the user equipment based on receiving the message, and communicate the information with the user equipment using the one or more transmit beams. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
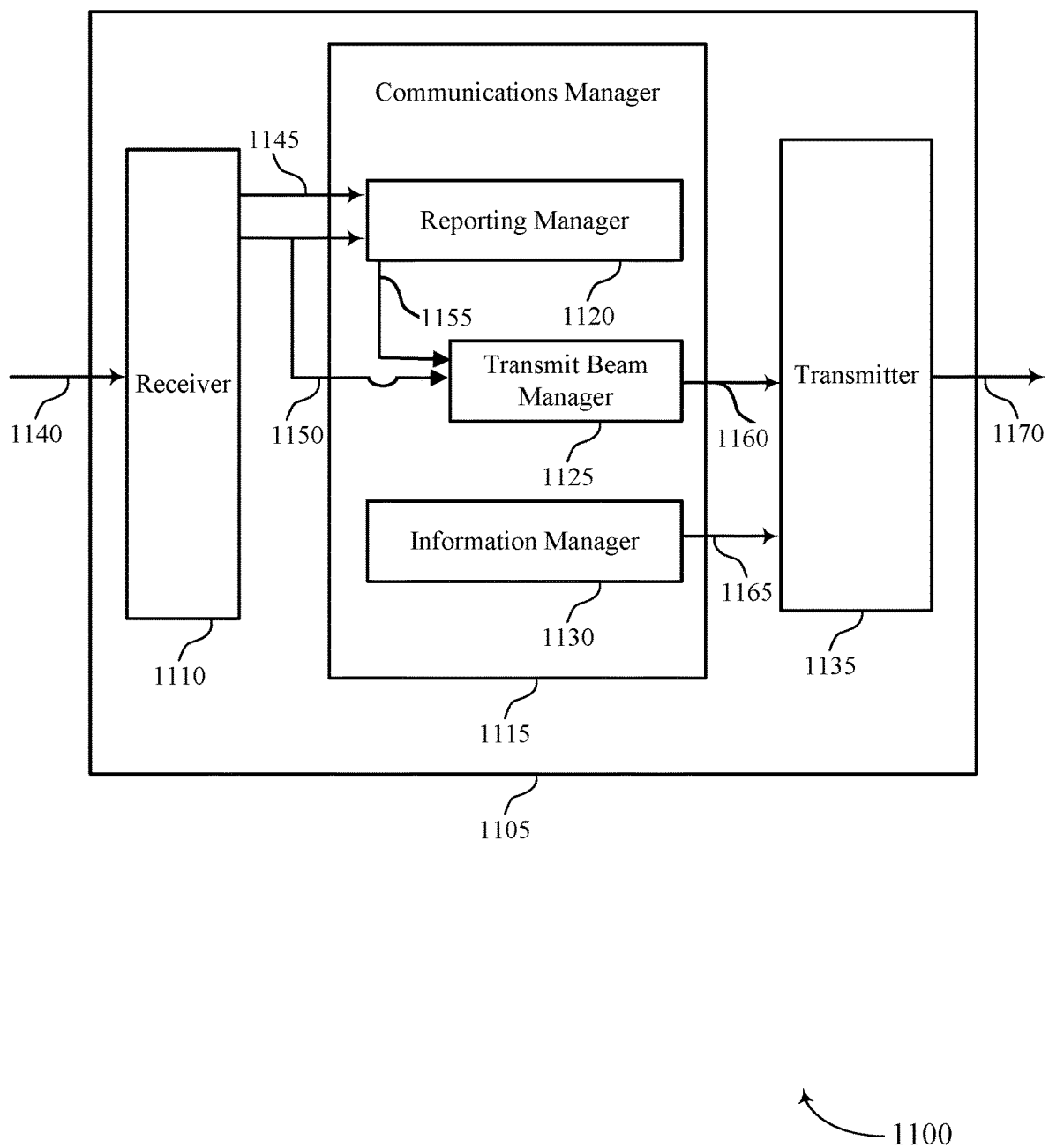

FIG. 11 shows a block diagram 1100 of a device 1105 that supports beam selection procedures for multi-stream environments in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive signaling 1140 such as packets, user data, or control information associated with various information channels (e.g., control channels, data channels, and information related to beam selection procedures for multi-stream environments, etc.). The signaling 1140 may include a reporting message which may include a set of bits indicating signal quality parameters for transmit beam sets. In some aspects, the signaling 1140 may include beam set information which may include a set of bits indicating the transmit beam sets. In some aspects, the reporting message may include inter-beam interference information related to inter-beam interference of a plurality of transmit beam sets which the device 1105 may use for communicating with a user equipment (e.g., UE 115). The inter-beam interference information may include a set of bits indicating respective amounts of interference associated with the transmit beam sets. The reporting message may include examples of aspects of reporting message 345 described with reference to FIG. 3.

The information in signaling 1140 received from another device (e.g., a UE 115) may be passed on to other components of the device 1105, such as the communications manager 1115. For example, the receiver 1110 may provide the reporting message 1145 and the beam set information 1150 to the communications manager 1115. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a reporting manager 1120, a transmit beam manager 1125, and an information manager 1130. The communications manager 1115 may be an example of aspects of the communications manager 1310 described herein.

The reporting manager 1120 may receive, from a user equipment (e.g., UE 115), a message (e.g., reporting message 1145) indicating signal quality information for a set of transmit beam sets, where the signal quality information of a first transmit beam set including a first transmit beam and a second transmit beam is based on a first signal quality parameter associated with receiving the first transmit beam via a first receive beam and a second signal quality parameter associated with receiving the second transmit beam via the first receive beam. For example, the reporting manager 1120 may receive, from the receiver 1110, the reporting message 1145 and the beam set information 1150. The reporting manager 1120 may output inter-beam interference information 1155 to the transmit beam manager 1125 and the information manager 1130 based on the reporting message 1145 and the beam set information 1150. The inter-beam interference information 1155 may include a set of bits indicating the signal quality information of the transmit beams and transmit beam sets.

The transmit beam manager 1125 may select one or more transmit beams from the set of transmit beam sets for communicating information 1165 with the user equipment based on receiving the reporting message 1145. For example, the transmit beam manager 1125 may select one or more transmit beams based on the inter-beam interference information 1155 received from the reporting manager 1120. The transmit beam manager 1125 may output beam selection information 1160 to the transmitter 1135. The beam selection information 1160 may include a set of bits indicating the one or more selected transmit beams for communicating information 1165 with the user equipment.

The information manager 1130 may communicate the information 1165 with the user equipment using the one or more selected transmit beams. The information 1165 may include, for example, packets, user data, or control information associated with various information channels (e.g., control channels, data channels, and information related to beam selection procedures for multi-stream environments, etc.).

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas. In an example, the transmitter 1135 may receive the information 1165 and may identify selected transmit beams over which the information 1165 is to be transmitted. In some examples, the transmitter 1135 may receive the information 1165 and may identify time-frequency resources over which the information 1165 is to be transmitted. The transmitter 1135 may modulate the information over the identified time-frequency resources in order to transmit the information 1165.

Figure 12:
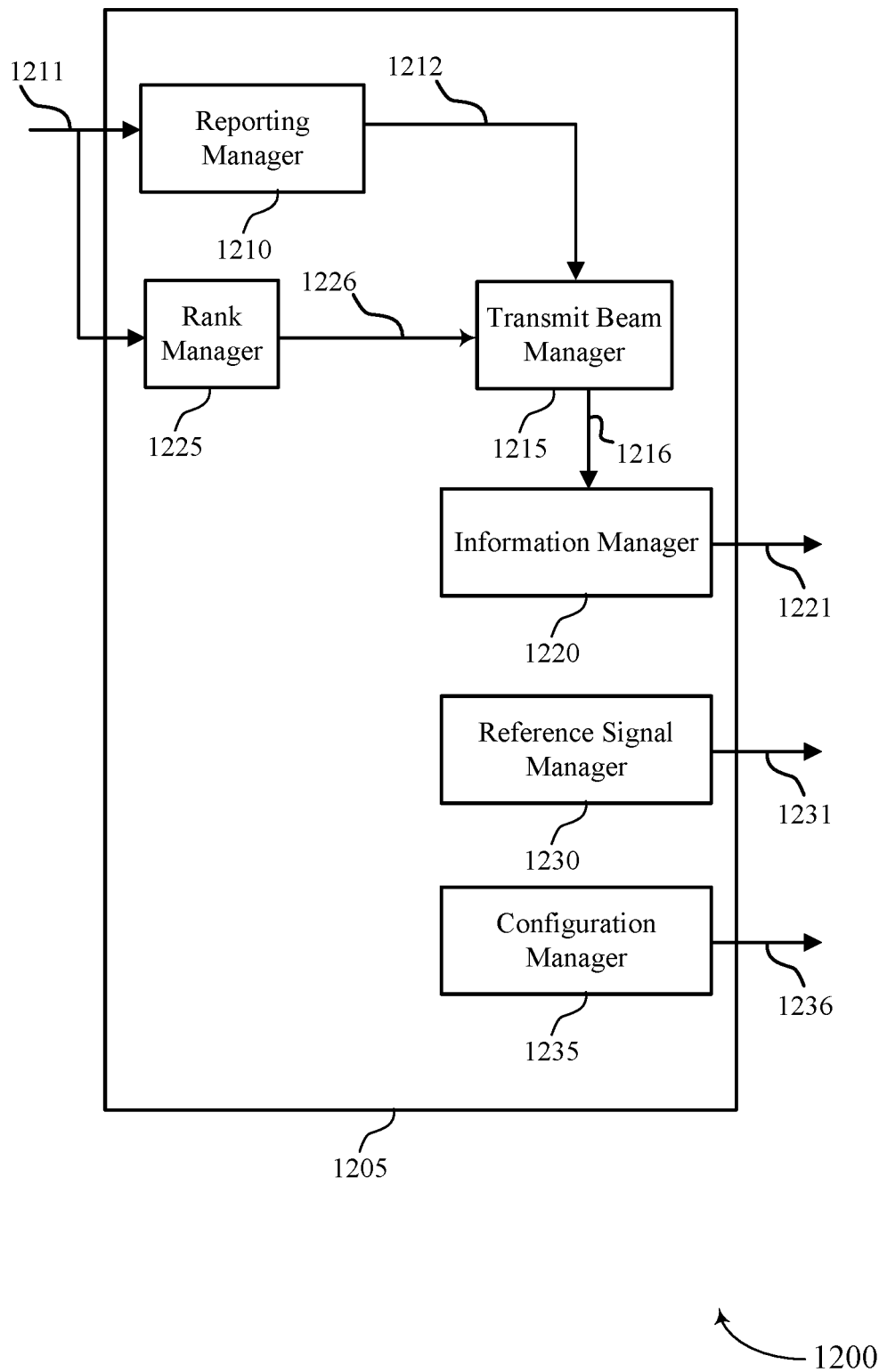
FIG. 12 shows a block diagram of a communications manager that supports beam selection procedures for multi-stream environments in accordance with aspects of the present disclosure.

FIG. 12 shows a block diagram 1200 of a communications manager 1205 that supports beam selection procedures for multi-stream environments in accordance with aspects of the present disclosure. The communications manager 1205 may be an example of aspects of a communications manager 1015, a communications manager 1115, or a communications manager 1310 described herein. The communications manager 1205 may include a reporting manager 1210, a transmit beam manager 1215, an information manager 1220, a rank manager 1225, a reference signal manager 1230, and a configuration manager 1235. Each of these modules may communicate, directly or indirectly, with one another (e.g., via one or more buses).

The reporting manager 1210 may receive, from a user equipment (e.g., via the receiver 1110), information 1211 such as packets associated with various information channels (e.g., data channels, and information related to retuning for flexible resource allocation, etc.). In an example, the information 1211 may include a message (e.g., reporting message 1145) indicating signal quality information for a set of transmit beam sets, where the signal quality information of a first transmit beam set including a first transmit beam and a second transmit beam is based on a first signal quality parameter associated with receiving the first transmit beam via a first receive beam and a second signal quality parameter associated with receiving the second transmit beam via the first receive beam. In some examples, the reporting manager 1210 may receive messages (e.g., multiple reporting messages 1145) from a set of user equipments, where the set of user equipments include the user equipment, where identifying the one or more transmit beams is based on receiving the messages from the set of user equipments. In some cases, the signal quality information of the message (or messages) includes signal quality information of transmit beams sets associated with a set of ranks. In some cases, the message (or messages) includes a first field indicating the first signal quality parameter of the first transmit beam and a second field indicating the second signal quality parameter of the second transmit beam. In some cases, the message (or messages) includes a field indicating a signal quality ratio of the first transmit beam and the second transmit beam of the first transmit beam set. In some cases, the signal quality ratio includes a signal-to-interference ratio of the first transmit beam and the second transmit beam. In some cases, the signal quality ratio includes a ratio of the first signal quality parameter to a sum of the second signal quality parameter and a noise measurement associated with the first receive beam.

In some aspects, the reporting manager 1210 may output inter-beam interference information 1212 to the transmit beam manager 1215. The inter-beam interference information 1212 may include a set of bits indicating values of the reference signals. The inter-beam interference information 1212 may include a set of bits indicating the signal quality information (e.g., signal quality parameters, signal quality ratio) of the transmit beams and transmit beam sets described herein.

The transmit beam manager 1215 may select one or more transmit beams from the set of transmit beam sets for communicating information with the user equipment based on receiving the message (e.g., reporting message 1145). In some aspects, the transmit beam set manager 1215 may receive the inter-beam interference information 1212 and rank information 1226. The transmit beam manager 1215 may select the set of transmit beam sets based on the inter-beam interference information 1212 and the rank information 1226. The transmit beam manager 1215 may output beam selection information 1216 (e.g., to information manager 1220). The beam selection information 1216 may include a set of bits indicating the beam sets and the selected beams included in the beam sets (e.g., a set of bits indicating identifiers associated with the beams and the beam sets). The beam selection information 1216 may include a set of bits indicating the one or more selected transmit beams for communicating information with the user equipment.

The information manager 1220 may communicate the beam selection information 1216 with the user equipment in signaling 1221 using the one or more transmit beams. The signaling 1221 may include, for example, packets, user data, or control information associated with various information channels (e.g., control channels, data channels, and information related to beam selection procedures for multi-stream environments, etc.).

The rank manager 1225 may receive, from a user equipment (e.g., via the receiver 1110), information 1211 such as packets associated with various information channels (e.g., data channels, and information related to retuning for flexible resource allocation, etc.). In an example, the information 1211 may include a message (e.g., reporting message 1145) as described herein. The rank manager 1225 may select a rank from a set of ranks for one or more transmissions based on receiving the message, where selecting the one or more transmit beams (e.g., at the transmit beam manager 1215) is based on selecting the rank. In some examples, the rank manager 1225 may identify transmission configuration indices associated with each beam of the set of transmit beam sets. In some examples, the rank manager 1225 may identify a subset of transmission configuration indices for the one or more transmit beams based on receiving the message, where selecting the one or more transmit beams is based on identifying the subset of transmission configuration indices. In some aspects, the rank manager 1225 may output rank information 1226 to the transmit beam manager 1215. The rank information 1226 may include a set of bits indicating the set of ranks for the one or more transmissions. In some aspects, the rank information 1226 may include a set of bits indicating the transmission configuration indices.

The reference signal manager 1230 may transmit, to the user equipment (e.g., via the transmitter 1135), signaling 1231 such as a reference signal, where receiving the message (e.g., reporting message) is based on transmitting the reference signal.

The configuration manager 1235 may transmit, to the user equipment (e.g., via the transmitter 1135), signaling 1236 such as packets or control information associated with various information channels (e.g., data channels, and information related to retuning for flexible resource allocation, etc.). In an example, the signaling 1231 may include a reporting configuration for a beam selection procedure, where receiving the message (e.g., reporting message) is based on transmitting the reporting configuration.

Figure 13:
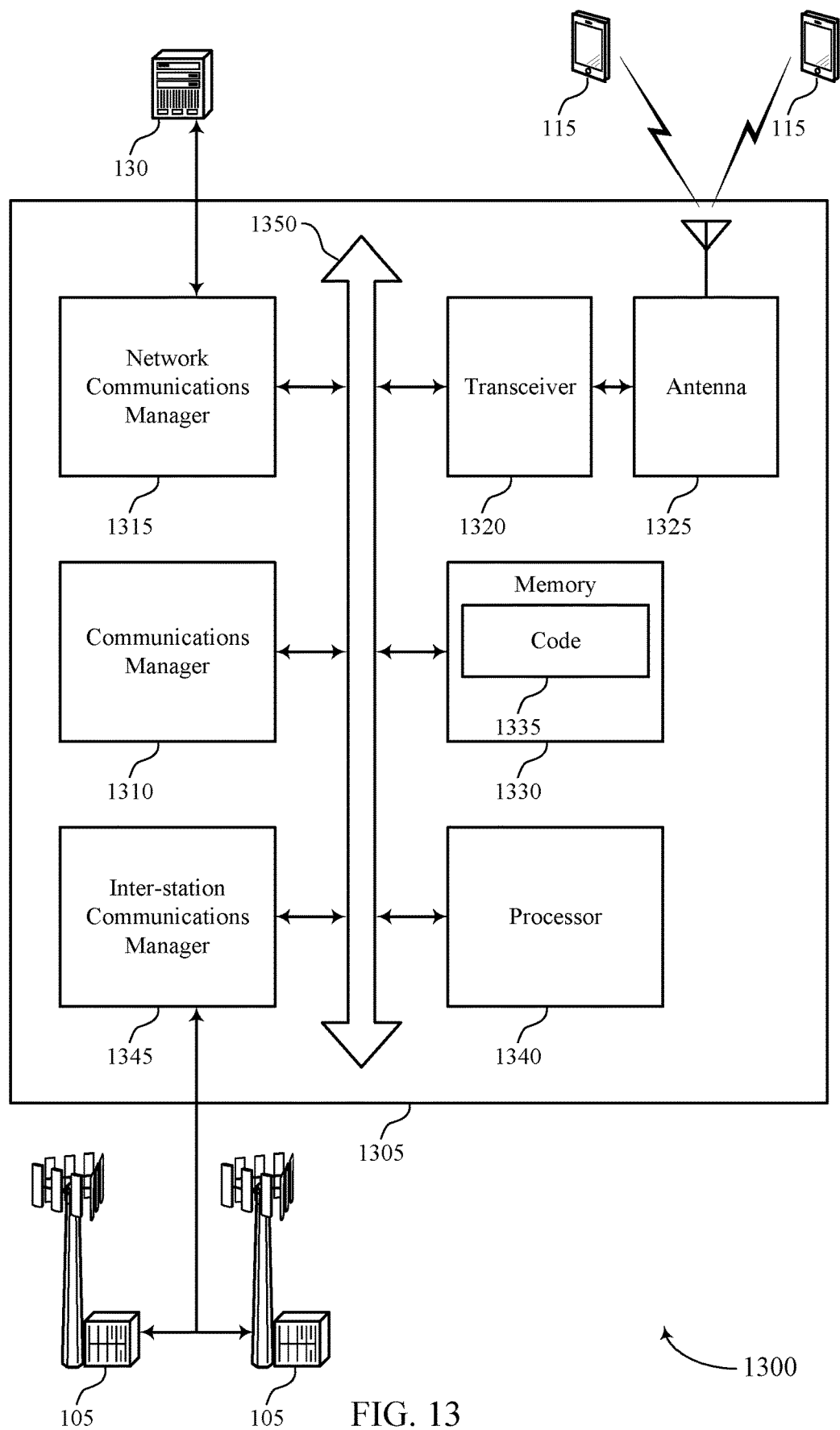
FIG. 13 shows a diagram of a system including a device that supports beam selection procedures for multi-stream environments in accordance with aspects of the present disclosure.

FIG. 13 shows a diagram of a system 1300 including a device 1305 that supports beam selection procedures for multi-stream environments in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive, from a user equipment, a message indicating signal quality information for a set of transmit beam sets, where the signal quality information of a first transmit beam set including a first transmit beam and a second transmit beam is based on a first signal quality parameter associated with receiving the first transmit beam via a first receive beam and a second signal quality parameter associated with receiving the second transmit beam via the first receive beam, select one or more transmit beams from the set of transmit beam sets for communicating information with the user equipment based on receiving the message, and communicate the information with the user equipment using the one or more transmit beams.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting beam selection procedures for multi-stream environments).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
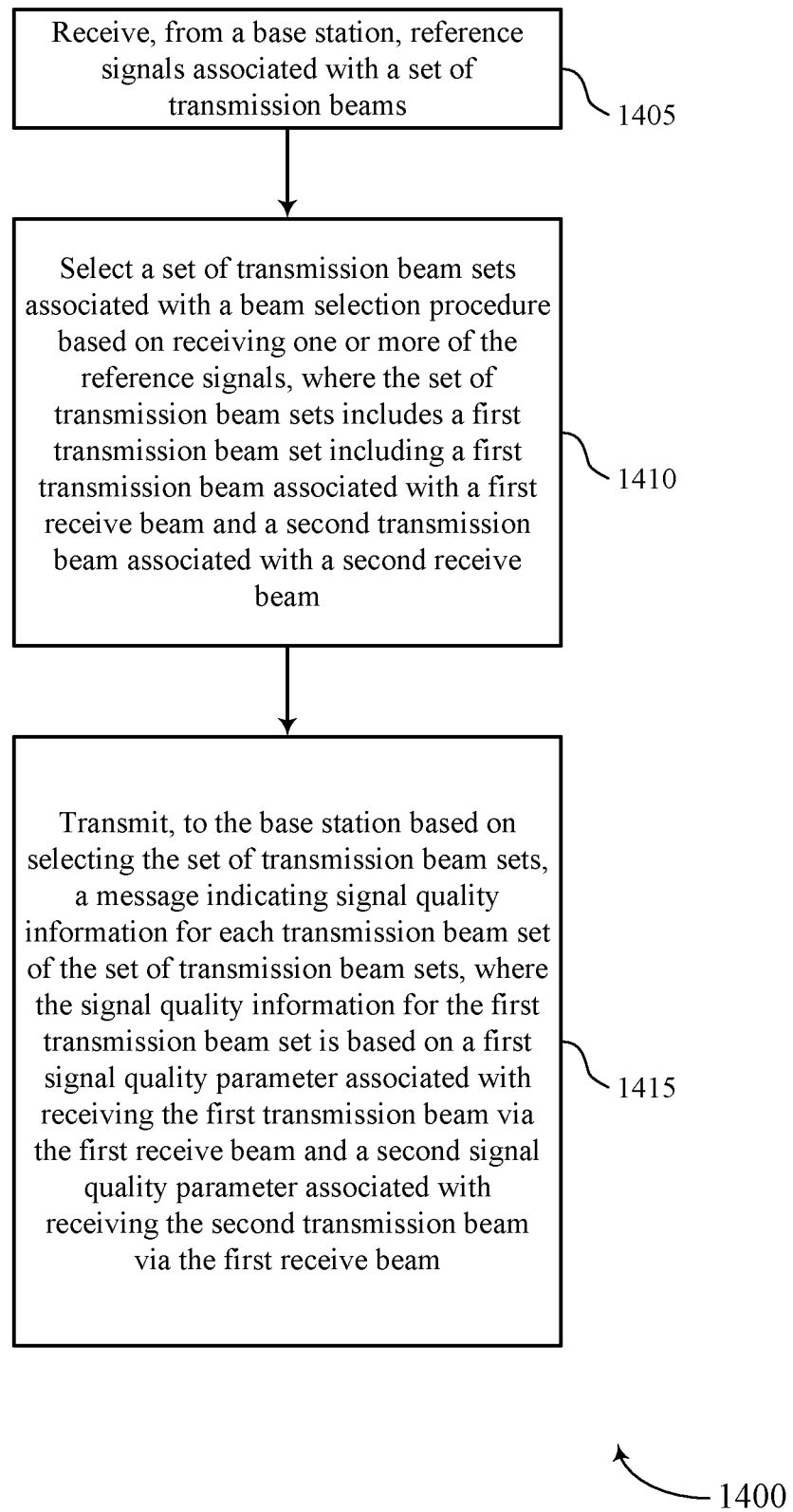
FIGS. 14 through 15 show flowcharts illustrating methods that support beam selection procedures for multi-stream environments in accordance with aspects of the present disclosure.

FIG. 14 shows a flowchart illustrating a method 1400 that supports beam selection procedures for multi-stream environments in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1405, the UE may receive, from a base station, reference signals associated with a set of transmit beams. The operations of 1405 may be performed according to the methods described herein. In some examples, aspects of the operations of 1405 may be performed by a reference signal manager as described with reference to FIGS. 6 through 9.

At 1410, the UE may select a set of transmit beam sets associated with a beam selection procedure based on receiving one or more of the reference signals, where the set of transmit beam sets includes a first transmit beam set including a first transmit beam associated with a first receive beam and a second transmit beam associated with a second receive beam. The operations of 1410 may be performed according to the methods described herein. In some examples, aspects of the operations of 1410 may be performed by a transmit beam set manager as described with reference to FIGS. 6 through 9.

At 1415, the UE may transmit, to the base station based on selecting the set of transmit beam sets, a message indicating signal quality information for each transmit beam set of the set of transmit beam sets, where the signal quality information for the first transmit beam set is based on a first signal quality parameter associated with receiving the first transmit beam via the first receive beam and a second signal quality parameter associated with receiving the second transmit beam via the first receive beam. The operations of 1415 may be performed according to the methods described herein. In some examples, aspects of the operations of 1415 may be performed by a reporting manager as described with reference to FIGS. 6 through 9.

Figure 15:
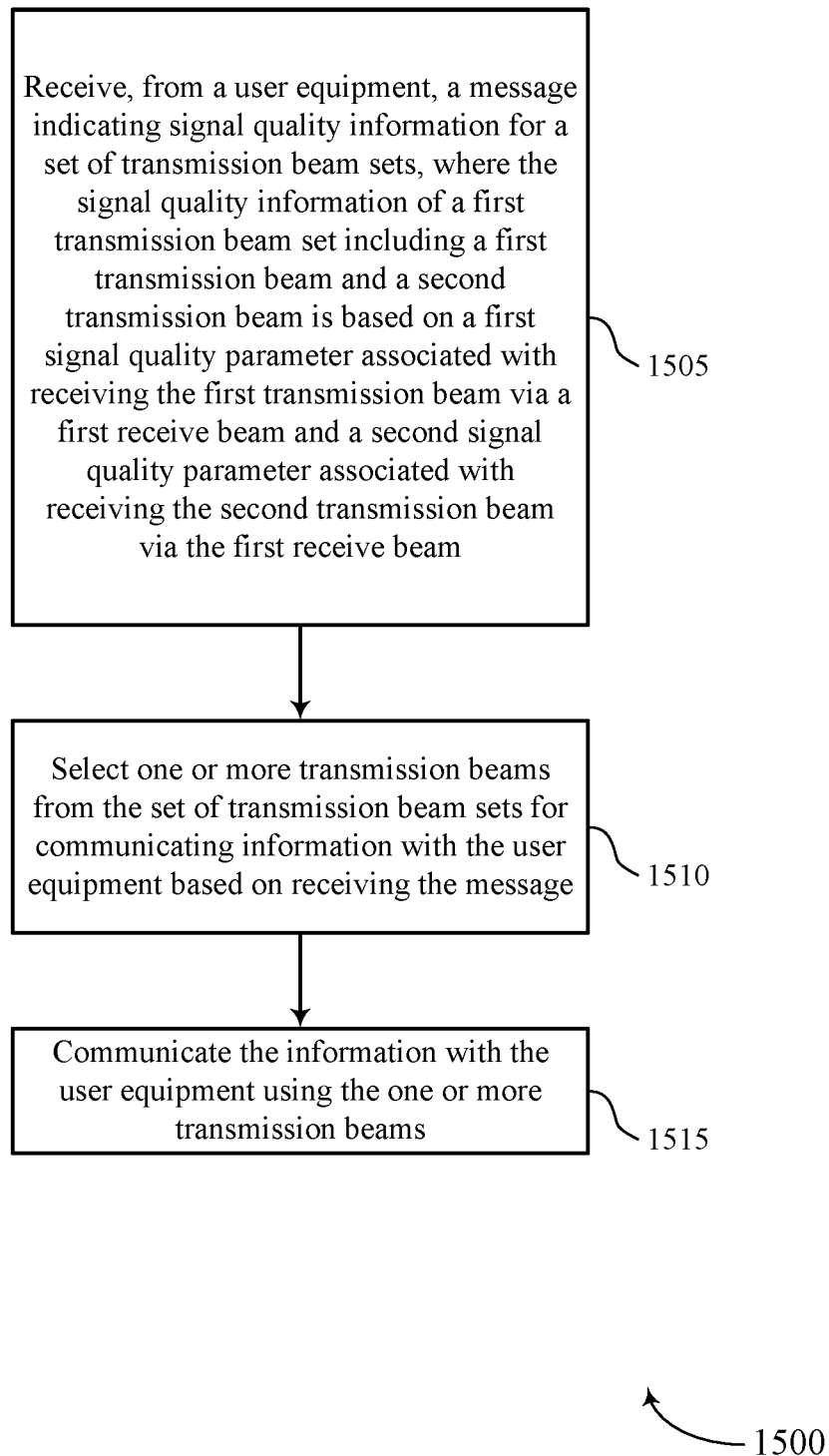

FIG. 15 shows a flowchart illustrating a method 1500 that supports beam selection procedures for multi-stream environments in accordance with aspects of the present disclosure. The operations of method 1500 may be implemented by a base station 105 or its components as described herein. For example, the operations of method 1500 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 1505, the base station may receive, from a user equipment, a message indicating signal quality information for a set of transmit beam sets, where the signal quality information of a first transmit beam set including a first transmit beam and a second transmit beam is based on a first signal quality parameter associated with receiving the first transmit beam via a first receive beam and a second signal quality parameter associated with receiving the second transmit beam via the first receive beam. The operations of 1505 may be performed according to the methods described herein. In some examples, aspects of the operations of 1505 may be performed by a reporting manager as described with reference to FIGS. 10 through 13.

At 1510, the base station may select one or more transmit beams from the set of transmit beam sets for communicating information with the user equipment based on receiving the message. The operations of 1510 may be performed according to the methods described herein. In some examples, aspects of the operations of 1510 may be performed by a transmit beam manager as described with reference to FIGS. 10 through 13.

At 1515, the base station may communicate the information with the user equipment using the one or more transmit beams. The operations of 1515 may be performed according to the methods described herein. In some examples, aspects of the operations of 1515 may be performed by an information manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. As used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment, comprising:
   receiving, from a base station, reference signals associated with a plurality of transmit beams;
   selecting a plurality of transmit beam sets associated with a beam selection procedure based at least in part on receiving one or more of the reference signals, wherein the plurality of transmit beam sets comprises a first transmit beam set comprising a first transmit beam associated with a first receive beam and a second transmit beam associated with a second receive beam; and
   transmitting, to the base station based at least in part on selecting the plurality of transmit beam sets, a message indicating signal quality information for each transmit beam set of the plurality of transmit beam sets, wherein the signal quality information for the first transmit beam set is based at least in part on a first signal quality parameter associated with receiving the first transmit beam via the first receive beam and a second signal quality parameter associated with receiving the second transmit beam via the first receive beam.

2. The method of claim 1, wherein the signal quality information for the first transmit beam set is based at least in part on a third signal quality parameter associated with receiving the second transmit beam via the second receive beam and a fourth signal quality parameter associated with receiving the first transmit beam via the second receive beam.

3. The method of claim 2, wherein the message includes a first field indicating the first signal quality parameter, a second field indicating the second signal quality parameter, a third field indicating the third signal quality parameter, and a fourth field indicating the fourth signal quality parameter.

4. The method of claim 2, further comprising:
   identifying a first signal quality ratio between the first signal quality parameter and the second signal quality parameter and a second signal quality ratio between the third signal quality parameter and the fourth signal quality parameter, wherein the message includes a first field indicating the first signal quality ratio and a second field indicating the second signal quality ratio.

5. The method of claim 2, further comprising:
   identifying a first signal quality ratio between the first signal quality parameter and a combination of the second signal quality parameter and a first noise measurement associated with the first receive beam and a second signal quality ratio between the third signal quality parameter and a combination of the fourth signal quality parameter and a second noise measurement associated with the second receive beam, wherein the message includes a first field indicating the first signal quality ratio and a second field indicating the second signal quality ratio.

6. The method of claim 2, wherein the first receive beam is associated with a first antenna panel of the user equipment and the second receive beam is associated with a second antenna panel of the user equipment.

7. The method of claim 1, further comprising:
   identifying a plurality of ranks for one or more transmissions, wherein selecting the plurality of transmit beam sets comprises selecting one or more transmit beam sets for each rank of the plurality of ranks.

8. The method of claim 1, further comprising:
   selecting a rank from a plurality of ranks for reporting to the base station, wherein the signal quality information of the message includes signal quality information associated with the selected rank of the plurality of ranks.

9. The method of claim 1, further comprising:
identifying transmission configuration indices associated with the plurality of transmit beams, wherein the message indicates a selected subset of the transmission configuration indices.

10. The method of claim 1, further comprising:
identifying a rank for one or more transmissions; and
identifying a quantity of transmit beams in each transmit beam set of the plurality of transmit beam sets based at least in part on identifying the rank, wherein selecting the plurality of transmit beam sets is based at least in part on identifying the quantity of transmit beams in each transmit beam set.

11. The method of claim 1, further comprising:
receiving, from the base station, a reporting configuration for the beam selection procedure, wherein selecting the plurality of transmit beam sets is based at least in part on receiving the reporting configuration.

12. The method of claim 1, wherein the signal quality information of the message includes signal quality information associated with each rank of a plurality of ranks for one or more transmissions.

13. The method of claim 1, wherein receiving the reference signals further comprises:
receiving a first reference signal at a first antenna panel coupled with a first radio frequency chain; and
receiving a second reference signal at a second antenna panel coupled with a second radio frequency chain,
wherein the first transmit beam is selected for the first antenna panel and the second transmit beam is selected for the second antenna panel.

14. The method of claim 1, wherein selecting the plurality of transmit beam sets further comprises:
identifying a set of transmit beams comprising the plurality of transmit beams;
selecting transmit beam sets for the plurality of transmit beam sets, the selecting comprising:
selecting, for one of a plurality of antenna panels, a transmit beam having a highest signal quality from the set of transmit beams;
selecting, for one or more additional antenna panels of the plurality of antenna panels, a transmit beam having a next-highest signal quality from the set of transmit beams; and
removing the selected transmit beams from the set of transmit beams.

15. A method for wireless communication at a base station, comprising:
receiving, from a user equipment, a message indicating signal quality information for a plurality of transmit beam sets, wherein the signal quality information of a first transmit beam set comprising a first transmit beam and a second transmit beam is based at least in part on a first signal quality parameter associated with receiving the first transmit beam via a first receive beam and a second signal quality parameter associated with receiving the second transmit beam via the first receive beam;
selecting one or more transmit beams from the plurality of transmit beam sets for communicating information with the user equipment based at least in part on receiving the message; and
communicating the information with the user equipment using the one or more transmit beams.

16. The method of claim 15, wherein the message includes a first field indicating the first signal quality parameter of the first transmit beam and a second field indicating the second signal quality parameter of the second transmit beam.

17. The method of claim 15, wherein the message includes a field indicating a signal quality ratio of the first transmit beam and the second transmit beam of the first transmit beam set.

18. The method of claim 17, wherein the signal quality ratio comprises a signal-to-interference ratio of the first transmit beam and the second transmit beam.

19. The method of claim 17, wherein the signal quality ratio comprises a ratio of the first signal quality parameter to a sum of the second signal quality parameter and a noise measurement associated with the first receive beam.

20. The method of claim 15, wherein the signal quality information of the message includes signal quality information of transmit beams sets associated with a plurality of ranks.

21. The method of claim 15, further comprising:
selecting a rank from a plurality of ranks for one or more transmissions based at least in part on receiving the message, wherein selecting the one or more transmit beams is based at least in part on selecting the rank.

22. The method of claim 15, further comprising:
identifying transmission configuration indices associated with each beam of the plurality of transmit beam sets; and
identifying a subset of transmission configuration indices for the one or more transmit beams based at least in part on receiving the message, wherein selecting the one or more transmit beams is based at least in part on identifying the subset of transmission configuration indices.

23. The method of claim 15, further comprising:
transmitting, to the user equipment, a reference signal, wherein receiving the message is based at least in part on transmitting the reference signal.

24. The method of claim 15, further comprising:
transmitting, to the user equipment, a reporting configuration for a beam selection procedure, wherein receiving the message is based at least in part on transmitting the reporting configuration.

25. The method of claim 15, further comprising:
receiving messages from a plurality of user equipments, wherein the plurality of user equipments comprise the user equipment, wherein identifying the one or more transmit beams is based at least in part on receiving the messages from the plurality of user equipments.

26. An apparatus for wireless communication at a user equipment, comprising: a processor, memory coupled with the processor; and instructions stored in the memory and executable by the processor to cause the apparatus to:
receive, from a base station, reference signals associated with a plurality of transmit beams;
select a plurality of transmit beam sets associated with a beam selection procedure based at least in part on receiving one or more of the reference signals, wherein the plurality of transmit beam sets comprises a first transmit beam set comprising a first transmit beam associated with a first receive beam and a second transmit beam associated with a second receive beam; and
transmit, to the base station based at least in part on selecting the plurality of transmit beam sets, a message indicating signal quality information for each transmit beam set of the plurality of transmit beam sets, wherein the signal quality information for the first transmit beam set is based at least in part on a first signal quality parameter associated with receiving the first transmit beam via the first receive beam and a second signal quality parameter associated with receiving the second transmit beam via the first receive beam.

27. The apparatus of claim 26, wherein the signal quality information for the first transmit beam set is based at least in part on a third signal quality parameter associated with receiving the second transmit beam via the second receive beam and a fourth signal quality parameter associated with receiving the first transmit beam via the second receive beam.

28. The apparatus of claim 27, wherein the message includes a first field indicating the first signal quality parameter, a second field indicating the second signal quality parameter, a third field indicating the third signal quality parameter, and a fourth field indicating the fourth signal quality parameter.

29. The apparatus of claim 27, wherein the instructions are further executable by the processor to cause the apparatus to:
identify a first signal quality ratio between the first signal quality parameter and the second signal quality parameter and a second signal quality ratio between the third signal quality parameter and the fourth signal quality parameter, wherein the message includes a first field indicating the first signal quality ratio and a second field indicating the second signal quality ratio.

30. An apparatus for wireless communication at a base station, comprising: a processor, memory coupled with the processor; and instructions stored in the memory and executable by the processor to cause the apparatus to:
receive, from a user equipment, a message indicating signal quality information for a plurality of transmit beam sets, wherein the signal quality information of a first transmit beam set comprising a first transmit beam and a second transmit beam is based at least in part on a first signal quality parameter associated with receiving the first transmit beam via a first receive beam and a second signal quality parameter associated with receiving the second transmit beam via the first receive beam;
select one or more transmit beams from the plurality of transmit beam sets for communicating information with the user equipment based at least in part on receiving the message; and
communicate the information with the user equipment using the one or more transmit beams.

* * * * *